(12) United States Patent
Kamoda et al.

(10) Patent No.: US 11,049,303 B2
(45) Date of Patent: Jun. 29, 2021

(54) IMAGING APPARATUS, AND OPERATION PROGRAM AND OPERATION METHOD FOR IMAGING APPARATUS

(71) Applicant: FUJIFILM Corporation, Tokyo (JP)

(72) Inventors: Rena Kamoda, Tokyo (JP); Hirona Yumbe, Tokyo (JP); Mayuko Ikuta, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 41 days.

(21) Appl. No.: 16/570,903

(22) Filed: Sep. 13, 2019

(65) Prior Publication Data

US 2020/0090388 A1 Mar. 19, 2020

(30) Foreign Application Priority Data

Sep. 18, 2018 (JP) .............................. JP2018-173716

(51) Int. Cl.
| | |
|---|---|
| *G06T 11/00* | (2006.01) |
| *G06T 11/60* | (2006.01) |
| *G06T 7/194* | (2017.01) |
| *G06K 9/46* | (2006.01) |

(52) U.S. Cl.
CPC ................ *G06T 11/60* (2013.01); *G06K 9/46* (2013.01); *G06T 7/194* (2017.01); *G06K 2209/01* (2013.01); *G06T 2200/24* (2013.01)

(58) Field of Classification Search
CPC ..... G06T 11/60; G06T 7/194; G06T 2200/24; G06K 9/46; G06K 2209/01; G06K 9/3258;

(Continued)

(56) References Cited

U.S. PATENT DOCUMENTS

| 10,452,897 | B1* | 10/2019 | Benkreira ........... G06K 9/00288 |
| 2002/0048032 | A1* | 4/2002 | Ichikawa ............. H04N 1/3875 |
| | | | 358/1.11 |
| 2012/0274813 | A1 | 11/2012 | Ishibashi |
| 2014/0184841 | A1* | 7/2014 | Woo .................... H04M 1/0264 |
| | | | 348/218.1 |

(Continued)

FOREIGN PATENT DOCUMENTS

| EP | 1 781 024 A2 | 5/2007 |
| EP | 2750372 A1 | 7/2014 |

(Continued)

OTHER PUBLICATIONS

The extended European search report issued by the European Patent Office dated Jan. 20, 2020, which corresponds to European Patent Application No. 19197238.9. and is related to U.S. Appl. No. 16/570,903.

(Continued)

*Primary Examiner* — Neil R McLean
(74) *Attorney, Agent, or Firm* — Studebaker & Brackett PC

(57) ABSTRACT

A portable terminal as an example of an imaging apparatus has an imaging unit that images a subject, a display unit that displays an image captured by the imaging unit in a live view mode, an extraction unit, a composition unit, and a display control unit. The imaging unit acquires a first image. The extraction unit extracts a part of the first image as a composition target for image composition. The composition unit composes the composition target to a second image captured by the imaging unit and different from the first image. The display control unit displays the second image, to which the composition target is composed, on the display unit in a live view mode.

18 Claims, 25 Drawing Sheets

(58) Field of Classification Search
CPC ............ G06K 9/00671; H04N 1/3875; H04N 1/3878; H04N 1/3871; H04N 5/265; H04N 1/387; H04N 5/23218; H04N 5/23232; H04N 5/272; H04N 5/232939; H04N 5/232941; H04N 5/23293
See application file for complete search history.

(56) References Cited

U.S. PATENT DOCUMENTS

| | | | | |
|---|---|---|---|---|
| 2015/0172560 | A1* | 6/2015 | Baek | H04N 5/2621 |
| | | | | 348/239 |
| 2016/0037067 | A1* | 2/2016 | Lee | H04N 5/232939 |
| | | | | 348/208.6 |
| 2016/0301869 | A1* | 10/2016 | Mitsunaga | G06F 3/14 |

FOREIGN PATENT DOCUMENTS

| | | |
|---|---|---|
| GB | 2464226 A | 4/2010 |
| JP | 2012-235227 A | 11/2012 |
| JP | 2013-143725 A | 7/2013 |
| JP | 2018056894 A | 4/2018 |
| KR | 20140141312 A | 12/2014 |

OTHER PUBLICATIONS

Communication pursuant to Article 94(3) EPC issued by the European Patent Office dated Feb. 22, 2021, which corresponds to European Patent Application No. 19197238.9-1208 and is related to U.S. Appl. No. 16/570,903.

* cited by examiner

IMAGING APPARATUS, AND OPERATION PROGRAM AND OPERATION METHOD FOR IMAGING APPARATUS

CROSS-REFERENCE TO RELATED APPLICATIONS

The present application claims priority under 35 U.S.C. § 119 to Japanese Patent Application No. 2018-173716 filed on Sep. 18, 2018. The above application is hereby expressly incorporated by reference, in its entirety, into the present application.

BACKGROUND

1. Technical Field

A technique of the present disclosure relates to an imaging apparatus, and an operation program and an operation method for an imaging apparatus.

2. Description of the Related Art

In an imaging method using an imaging apparatus, such as a digital camera, an imaging method that obtains a composite image, in which all of a plurality of captured images continuously captured are superimposed in such a manner that a first captured image and a second captured image are superimposed, is known (JP2013-143725A and JP2012-235227A). Such an imaging method is referred to as multiple exposure imaging or the like.

The imaging apparatus described in JP2013-143725A or JP2012-235227A has a display, such as an LCD, and has a function of subjecting a subject to live view display on the display. The live view display is a function of successively displaying a captured image as a through image on the display. The imaging apparatus described in JP2013-143725A or JP2012-235227A composes the first captured image previously captured to the second captured image subjected to live view display as a through image, thereby allowing a user to confirm the composite image through the display.

SUMMARY

In the imaging apparatus of the related art described in JP2013-143725A or JP2012-235227A, as described above, all of a plurality of images are superimposed. For this reason, for example, in a case where an unnecessary subject undesired by the user to be composed is reflected in the first captured image in addition to a specific subject desired by the user to be composed, an unnecessary subject is also composed in the composite image.

Of course, in a case of imaging, there is room to devise a structural outline such that an unnecessary subject is not reflected in a captured image. However, there is a limit to devise the structural outline due to a restriction on the positional relationship between the specific subject desired to be reflected and the unnecessary subject undesired to be reflected, and it is often difficult to exclude the reflection of the unnecessary subject in the captured image.

In a case where it is difficult to exclude the reflection of the unnecessary subject, there is a problem in that a degree of freedom relating to decision of a detail of a composite image desired by the user, for example, selection of a subject desired to be reflected in the composite image or exclusion of a subject undesired to be reflected, decreases.

An object of the present disclosure is to provide an imaging apparatus having a large degree of freedom relating to decision of a subject to be reflected in a composite image compared to the related art, in which all of a plurality of images are composed, and an operation program and an operation method for an imaging apparatus.

In order to achieve the above-described object, the present disclosure provides an imaging apparatus comprising an imaging unit that images a subject, a display unit that subjects an image captured by the imaging unit to live view display, an image acquisition unit that acquires a first image as an image displayed on the display unit, an extraction unit that extracts a part of the first image as a composition target for image composition, a composition unit that composes the composition target to a second image captured by the imaging unit and different from the first image, and a display control unit that performs control such that the second image, to which the composition target is composed, is subjected to live view display on the display unit.

It is preferable that the composition target includes a mark or a character string reflected in a partial area in the first image.

It is preferable that the character string includes a message, and the mark includes at least one of a character, a figure, a pattern, or a combination of two or more selected from the character, the figure, and the pattern.

It is preferable that the extraction unit determines a contour of the mark or the character string in the first image and extracts the mark or the character string along the determined contour.

It is preferable that the first image is an image captured by the imaging unit and is subjected to live view display on the display unit.

It is preferable that the extraction unit extracts the composition target from the first image during the live view display.

It is preferable that the imaging apparatus further comprises a first designation reception unit that receives designation of the composition target during the live view display of the first image.

It is preferable that, after the composition target is extracted from the first image during the live view display, the display control unit starts the live view display of the second image to which the composition target is composed.

It is preferable that, in a case where the extraction unit extracts the composition target from the first image, the display control unit performs a visual performance for identifying the extracted composition target and a background of the first image as an extraction source on the display unit.

It is preferable that the imaging apparatus further comprises a recording unit that, in a case where an image saving instruction is input during the live view display of the second image, records the second image, to which the composition target is composed, as a composite image for saving in a memory.

It is preferable that the imaging apparatus further comprises a second designation reception unit that receives designation of at least one of a display position, a display posture, a display size, or a display color of the composition target as an edition instruction of the composition target in the second image during the live view display of the second image.

It is preferable that the imaging apparatus further comprises an optical character reader (OCR) processing unit that, in a case where the composition target includes a character, converts the character to a character code, and a font change unit that changes a font of the character based on the character code, and the composition unit composes the character after the font change to the second image.

The present disclosure provides an operation program for an imaging apparatus comprising an imaging unit that images a subject, and a display unit that subjects an image captured by the imaging unit to live view display. The operation program causes a computer to execute an image acquisition step of acquiring a first image as an image displayed on the display unit, an extraction step of extracting a part of the first image as a composition target for image composition, a composition step of composing the composition target to a second image captured by the imaging unit and different from the first image, and a display control step of performing control such that the second image, to which the composition target is composed, is subjected to live view display on the display unit.

The present disclosure provides an operation method for an imaging apparatus comprising an imaging unit that images a subject, and a display unit that subjects an image captured by the imaging unit to live view display. The operation method comprises an image acquisition step of acquiring a first image as an image displayed on the display unit, an extraction step of extracting a part of the first image as a composition target for image composition, a composition step of composing the composition target to a second image captured by the imaging unit and different from the first image, and a display control step of performing control such that the second image, to which the composition target is composed, is subjected to live view display on the display unit.

According to the technique of the present disclosure, it is possible to increase a degree of freedom relating to decision of a subject to be reflected in a composite image compared to the related art, in which all of a plurality of images are composed.

BRIEF DESCRIPTION OF THE DRAWINGS

Exemplary embodiments according to the technique of the present disclosure will be described in detail based on the following figures, wherein.

DETAILED DESCRIPTION

Figure 1:
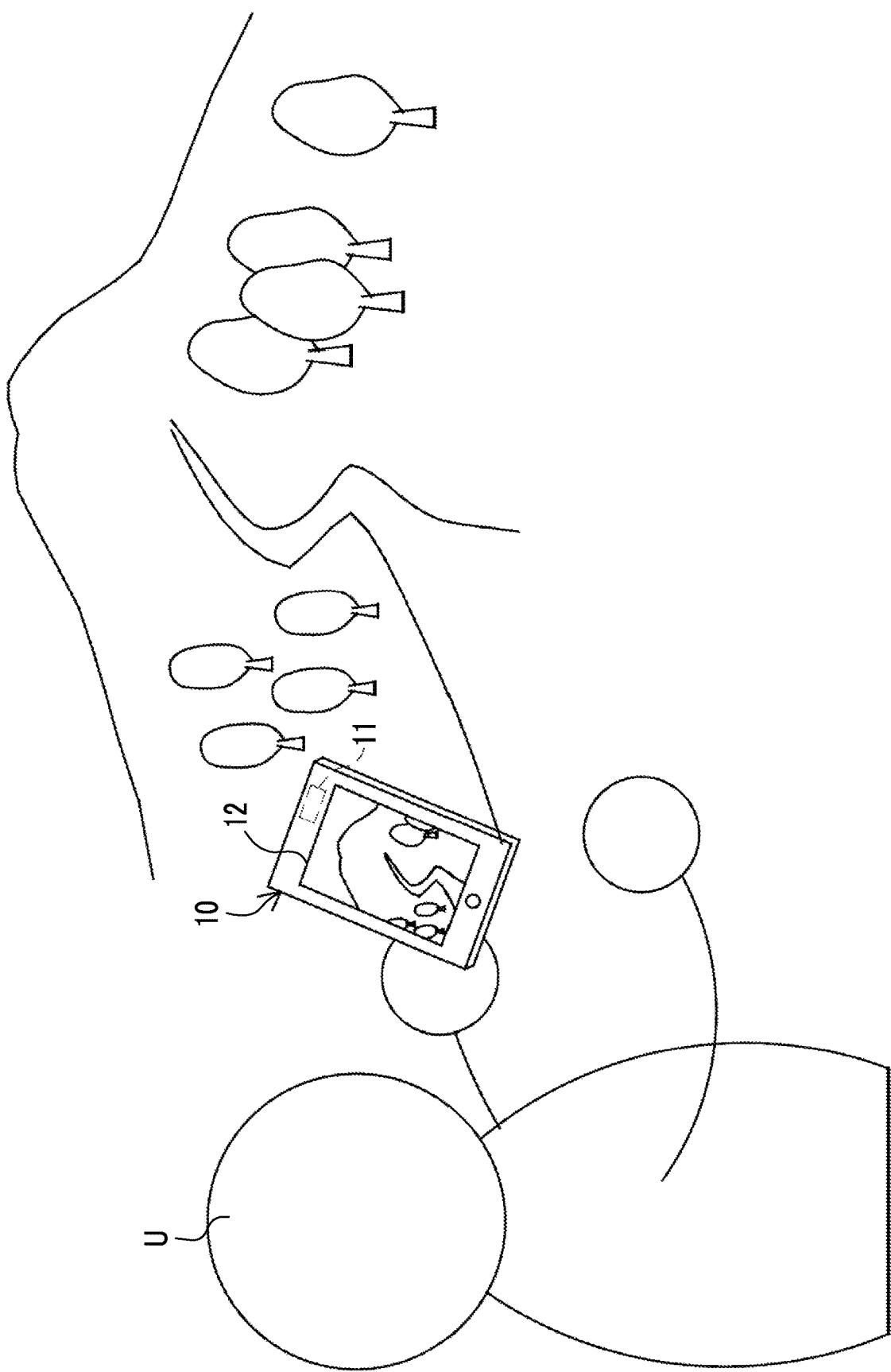
FIG. 1 is a diagram showing an aspect in which a user captures an image using a portable terminal as an example of an imaging apparatus.

Hereinafter, an example of an embodiment according to a technique of the present disclosure will be described referring to the drawings. As shown in FIG. 1, a portable terminal 10 is, for example, a smartphone. The portable terminal 10 functions as a computer that executes various application programs called applications, in addition to functioning as a mobile phone. The portable terminal 10 can also perform photographing, and is an example of an imaging apparatus.

In a main body of the portable terminal 10, an imaging unit 11 (see FIG. 2) that images a subject is incorporated. The portable terminal 10 is provided with a touch panel display 12 on a front surface of the main body. The portable terminal 10 can perform live view display for successively displaying a captured image captured by the imaging unit 11 as a through image on the touch panel display 12.

In the live view display, for example, the imaging unit 11 outputs the captured images at a frame rate of 30 frames per second, and the through images displayed on the touch panel display 12 are changed at the frame rate. For this reason, the through images subjected to the live view display are viewed as a motion image. Since the subject is subjected to the live view display, a user U can perform imaging while confirming the structural outline of the subject and the captured images through the display of the touch panel display 12.

Figure 2:
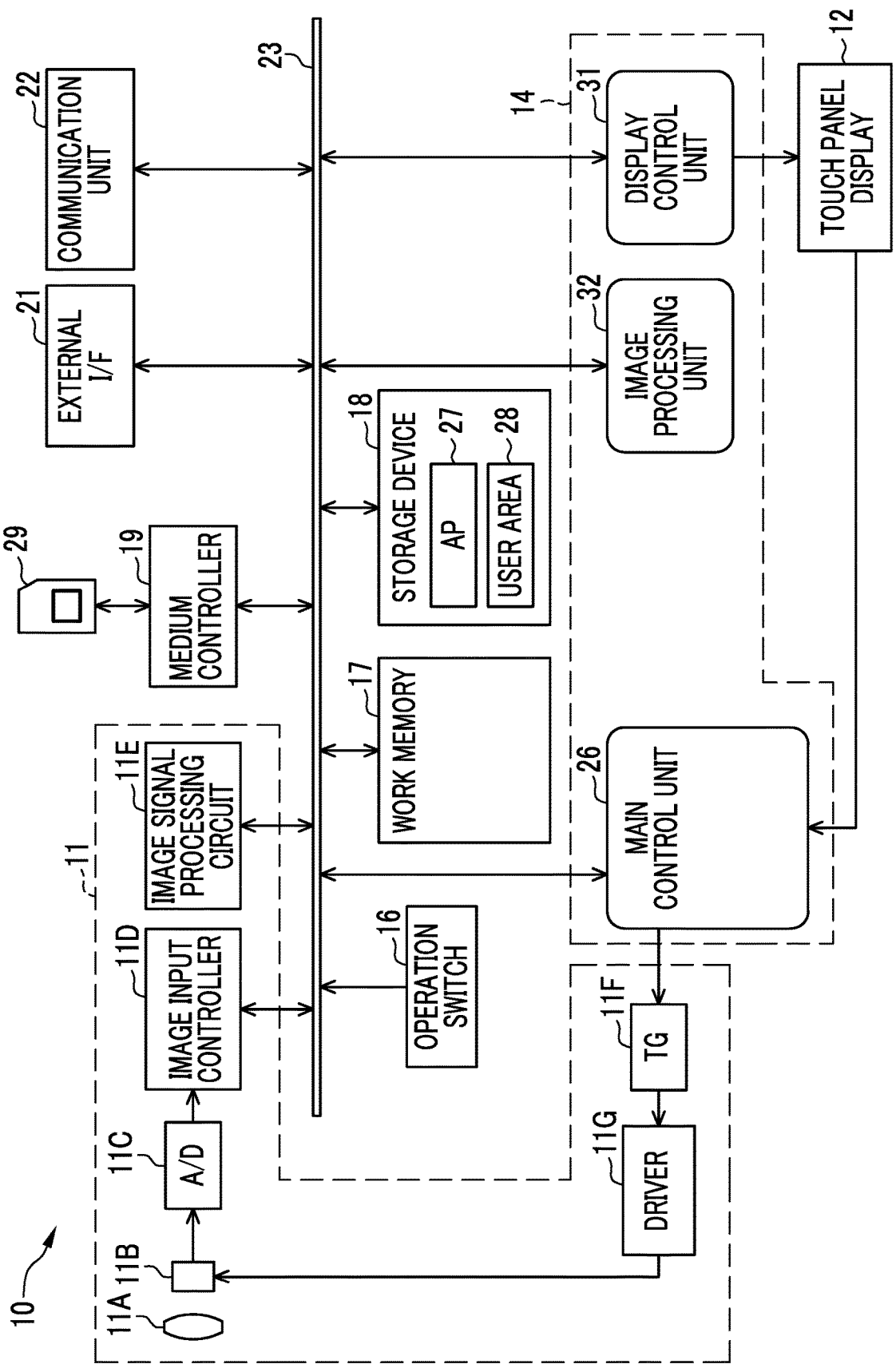
FIG. 2 is a diagram showing the outline of the electrical configuration of the portable terminal.

As shown in FIG. 2 as an example, the portable terminal 10 comprises the imaging unit 11, the touch panel display 12, a central processing unit (CPU) 14, an operation switch 16, a work memory 17, a storage device 18, a medium controller 19, an external interface (I/F) 21, and a communication unit 22. These units are connected to be communicable through a bus line 23.

The CPU 14 functions as a main control unit 26 and a display control unit 31 by executing an operating system.

The main control unit 26 integrally controls the units of the portable terminal 10. The display control unit 31 controls the display of the touch panel display 12. The CPU 14 also functions as an image processing unit 32 that executes image processing on an image captured by the imaging unit 11.

The work memory 17 is a volatile memory that is used as a work memory in a case where the CPU 14 executes various programs, and a random access memory (RAM) is used. The work memory 17 is used as a work memory in a case where the live view display and the image processing are executed as described below.

The storage device 18 stores various programs, such as an application program (AP) 27, in addition to the operating system. As the application program 27, in addition to a photograph composition application program described below, image display software, a Web browser, a mail application program, and the like are included.

The storage device 18 is provided with a user area 28 where data of the user, such as an image captured by the user using the portable terminal 10, is stored. The storage device 18 is, for example, a nonvolatile memory, such as a flash memory. As the storage device 18, a hard disk drive (HDD), a solid state drive (SSD), or the like may be used.

The touch panel display 12 is an example of a display unit that displays an operation screen functioning as a graphical user interface (GUI), an image captured by the imaging unit 11, and the like stored in the storage device 18. The touch panel display 12 comprises a function of detecting a touch operation with a finger of the user U, or the like, and is an example of an input device that detects the touch operation to input an operation instruction to the main control unit 26. As well known in the related art, the touch panel display 12 has, for example, a display unit, such as a liquid crystal display (LCD) or an organic electro-luminescence (EL) display, and a touch panel unit, such as a resistive film type or an electrostatic capacitance type.

The operation switch 16 includes various mechanical operating units, such as a multi-function key and a power button provided in the main body of the portable terminal 10, and is an example of an input device that inputs an operation instruction to the main control unit 26.

The main control unit 26 is an operation reception unit that receives an input of the operation instruction from the touch panel display 12 and the operation switch 16.

The display control unit 31 performs controls that the operation screen, the image, and the like are displayed on the touch panel display 12 under the control of the main control unit 26. The display control unit 31 executes processing for converting data, such as the operation screen and the image, to a video signal to be handled by the touch panel display 12 and outputs the video signal to the touch panel display 12.

The image processing unit 32 executes various kinds of image processing, such as image extraction and image composition described below, to the captured images captured by the imaging unit 11, in addition to general image processing, called brightness correction and compression and expansion processing.

The medium controller 19 writes and reads data to and from an attachable and detachable removable medium, such as a memory card 29.

The external I/F 21 is, for example, an interface, such as a universal serial bus (USB) connector. A charging cable, a communication cable, a USB memory, and the like are connected to the external I/F 21.

The communication unit 22 has an antenna and a communication control circuit, and takes a communication function, such as wireless communication or short-range wireless communication through a mobile communication network and a wireless local area network (LAN).

The imaging unit 11 has, for example, an imaging lens 11A, an image sensor 11B, an analog-to-digital (AD) converter (A/D) 11C, an image input controller 11D, an image signal processing circuit 11E, a timing generator (TG) 11F, and a driver 11G.

The imaging lens 11A collects light from the subject and makes a subject image be formed an image forming surface of the image sensor 11B.

The image sensor 11B is an imaging element that images subject light, photoelectrically converts subject light, and outputs subject light as an analog image signal. As the image sensor 11B, for example, a charge coupled device (CCD) image sensor or a complementary metal oxide semiconductor (CMOS) image sensor is used. The image sensor 11B successively outputs the analog image signal at a frame rate set in advance during live view display.

The AD converter 11C converts the analog image signal from the image sensor 11B to a digital image signal. The image input controller 11D records the digital image signal input from the AD converter 11C as a captured image in the work memory 17. The image input controller 11D records the captured image as a through image in the work memory 17 while light view imaging is performed. In the work memory 17, the through image is used for live view display, and is successively updated in conformity with the frame rate of the image sensor 11B.

The image signal processing circuit 11E executes various kinds of signal processing, such as white balance processing, gamma correction processing, and YC conversion processing, on the captured image recorded in the work memory 17 by the image input controller 11D. The white balance processing is processing for adjusting a gain of each image signal of R (red), G (green), and B (blue) included in the captured image to adjust white balance. The gamma correction processing is gradation conversion processing that is executed on the image signal according to gamma characteristics stored in advance. The YC conversion processing is processing for converting the image signals of R, G, and B to a bright signal Y and color different signals Cr and Cb. The captured image processed by the image signal processing circuit 11E is rewritten to the work memory 17.

The timing generator 11F generates a timing signal for prescribing an operation timing of the image sensor 11B under the control of the main control unit 26. The driver 11G drives the image sensor 11B based on the timing signal from the timing generator 11F.

In a case where the imaging unit 11 is operated and the portable terminal 10 functions as an imaging apparatus, the display control unit 31 performs control such that the captured images captured by the imaging unit 11 are subjected to live view display as through images on the touch panel display 12. The live view display is started, for example, simultaneously with the start of the imaging unit 11. While the live view display is temporarily interrupted during the execution of an image saving operation according to an operation of the shutter button, basically, the live view display is continued until the operation of the imaging unit 11 ends.

More specifically, the imaging unit 11 successively outputs the captured image at the above-described frame rate, and the captured image is output to the work memory 17. The captured images are subjected to the signal processing by the image signal processing circuit 11E, and are then recorded in the work memory 17. In the live view display, the captured image is recorded as a through image in the work memory 17, and is successively updated at the above-described frame rate. In the work memory 17, two areas where the captured image successively output is recorded are provided. While the captured image in one area is being displayed, the captured image in the other area is updated. The area used for display and the area used for update are alternately switched. The display control unit 31 reads the through image successively updated in the work memory 17 and successively update the display of the touch panel display 12, thereby implementing the live view display. Here, imaging that is performed by the imaging unit 11 in order to perform the live view display is referred to as live view imaging.

During the live view display, in a case where the shutter button is operated by the user U, an image saving instruction is input. In a case where the image saving instruction is input, the captured image captured at this timing is saved in a saving destination set in advance between a user area 28 of the storage device 18 or the memory card 29. In a case of saving, the image processing unit 32 subjects the captured image to compression processing, and then, records the compressed captured image in the user area 28 or the memory card 29. In a case of recording of the captured image in the memory card 29, the image processing unit 32 performs recording through the medium controller 19.

The captured image for saving may be the image recorded in the work memory 17 in order to use the image as a through image or may be an image newly acquired by the imaging unit 11 at the timing of the operation of the shutter button. The resolution of the captured image for a through image may decrease to increase the resolution of the captured image for saving higher than the resolution of the captured image for a through image.

In the portable terminal 10, as one of the application program 27, a photograph composition application program that performs image composition on the through images to perform live view display is installed. The photograph composition application program extracts a part of a first image as a composition target during live view display of the first image as a through image. Then, a function of composing the extracted composition target to a second image different from the first image and subjecting the second image, to which the composition target is composed, to live view display as a through image is implemented in the portable terminal 10. The photograph composition application program is an example of an operation program that makes the portable terminal 10, which is a computer, function as an imaging apparatus.

Figure 3:
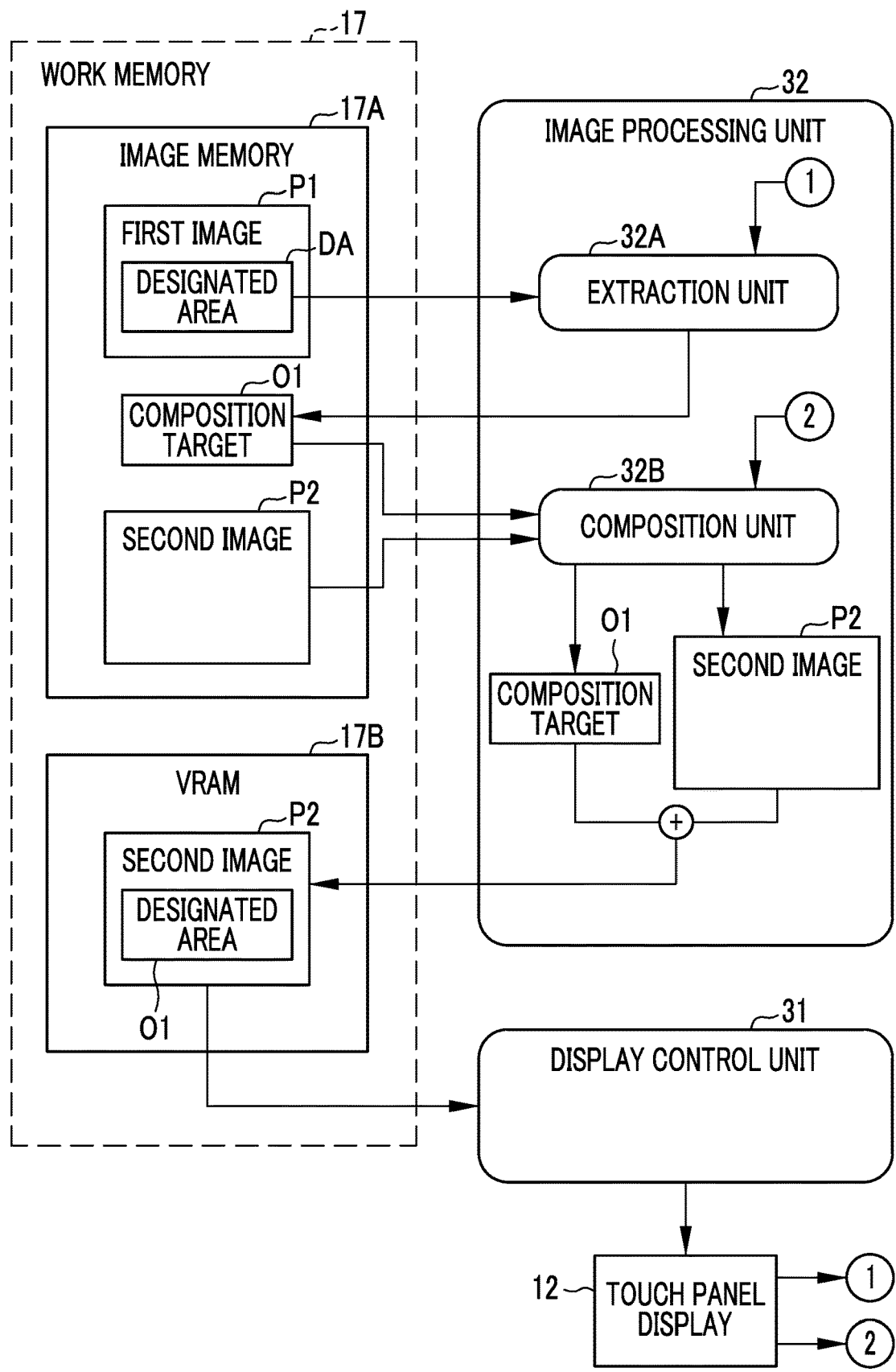
FIG. 3 is a functional block diagram of the portable terminal.

As shown in FIG. 3, in a case where the photograph composition application program is started, the image processing unit 32 functions as an extraction unit 32A and a composition unit 32B. In the work memory 17, areas that function as an image memory 17A and a video random access memory (VRAM) 17B are provided.

The image memory 17A is an area where the captured image output from the imaging unit 11 is temporarily recorded as a through image. The VRAM 17B is an area where the through image subjected to the image processing in the image processing unit 32 is recorded. The image processing unit 32 executes the image processing on the through image recorded in the image memory 17A and records the processed through image in the VRAM 17B. The display control unit 31 outputs the through image recorded in the VRAM 17B to the touch panel display 12.

In a case where the photograph composition application program is started, the imaging unit 11 starts live view imaging of a first image P1. In the image memory 17A, the first image P1 is recorded as a through image. The first image P1 in the image memory 17A is successively updated to a latest captured image output according to the frame rate of the imaging unit 11. The first image P1 is a through image captured by the imaging unit 11, and is an image to be an extraction source of a composition target O1. In more detail, in a case where the first image P1 is subjected to live view display as a through image, the first image P1 to be finally the extraction source of the composition target O1 is selected from among a plurality of first images P1 during the live view display. The extraction unit 32A extracts the composition target O1 from the selected first image P1.

The first image P1 is read from the image memory 17A by the image processing unit 32. The first image P1 is subjected to the image processing, such as brightness correction, by the image processing unit 32, and is then recorded in the VRAM 17B. The display control unit 31 subjects the first image P1 as a through image to live view display on the touch panel display 12. The image processing unit 32 is an example of an image acquisition unit that acquires the first image P1 from the image memory 17A as an image to be displayed on the touch panel display 12 as an example of a display unit.

In a case where the first image P1 is subject to the live view display, the display control unit 31 displays a target mark 46 (see FIG. 6) on the touch panel display 12 as a GUI for designating a designated area DA for extracting the composition target O1 in the first image P1.

The extraction unit 32A extracts a part of the first image P1 as the composition target O1 for image composition. Specifically, the extraction unit 32A determines an area designated as an extraction area for extracting the composition target O1 in the first image P1 to be the designated area DA, and extracts the composition target O1 from the designated area DA. The main control unit 26 receives a designation operation of the user U to designate a part of the first image P1 as an extraction area through the touch panel display 12. As described below, the designation operation is performed using the target mark 46. The main control unit 26 inputs information regarding the received designation operation to the extraction unit 32A.

The extraction unit 32A determines the designated area DA in the first image P1 based on information regarding the designation operation, and extracts the composition target O1 from the determined designated area DA. The main control unit 26 is an example of a first designation reception unit that receives the designation of the composition target O1 during the live view display of the first image P1.

The extraction unit 32A extracts, for example, a mark or a character string from the designated area DA. The mark includes at least one of a character, a figure, a pattern, and a combination of two or more selected from the character, the figure, and the pattern. The character is a concept including a numeral and a symbol. The mark includes a logo indicating a company name, a product name, a store name, a station name, a place name, or the like. The pattern includes a striped pattern, a checked pattern, a dotted pattern, or the like. The mark includes a mark having one character, one numeral, or one symbol.

The character string includes a message having handwritten characters or printed characters, a slogan for traffic safety, a greeting phrase of welcome or farewell of a tourist site, an advertisement of a product, or the like. The message is, for example, words that convey a thought toward a specific person, such as "Thanks for the other day" or "Congratulation on entrance", and includes words of congratulations, words of gratitude, greeting words, or the like.

In addition, a seal or a seal impression, such as a stamp to be given to a tourist at a tourist spot, is also included in the mark. A scarlet seal or the like that is a seal or a seal impression to be given to a visitor at a temple or a shrine is also included in any one of the mark or the character string. The character included in the mark or the character string is not limited to a Japanese character, and may be a foreign language, such as English, Chinese, or Korean.

For example, the extraction unit 32A determines a contour of the mark or the character string based on the contrast of an image in the designated area DA and extracts an area according to the determined contour as the mark or the character string. In a case where the composition target O1 is extracted from the first image P1, the extracted composition target O1 is recorded in the image memory 17A.

The imaging unit 11 starts live view imaging of a second image P2 in a state in which the composition target O1 is held in the image memory 17A. In the image memory 17A, the second image P2 is recorded as a through image. In the touch panel display 12, live view display of the second image P2 is started. The second image P2 is a through image captured by the imaging unit 11, and is an image of a composition destination to which the composition target O1 is composed.

The composition unit 32B composes the second image P2 and the composition target O1. The composition unit 32B arranges the composition target O1 so as to be displayed at the center of a display screen of the touch panel display 12 in an initial state, and superimposes the composition target O1 and the second image P2. The second image P2, to which the composition target O1 is composed, is recorded in the VRAM 17B. The display control unit 31 starts the live view display of the second image P2 to which the composition target O1 is composed.

The main control unit 26 receives the designation of at least one of a display position, a display posture, a display size, or a display color of the composition target O1 in the touch panel display 12 based on an operation instruction input through the touch panel display 12. The operation instruction received by the main control unit 26 is input to the composition unit 32B. The composition unit 32B changes the display position or the like of the composition target O1 in the second image P2 based on the input operation instruction.

Similarly to normal imaging, in a case where the shutter button is operated by the user U during the live view display of the second image P2, to which the composition target O1 is composed, the image saving instruction is input. In a case where the image saving instruction is input, the second image P2, to which the composition target O1 is composed, is saved at a saving destination set in advance between the user area 28 of the storage device 18 and the memory card 29 as a composite image for saving at this timing. In a case of saving, the image processing unit 32 subjects the composite image to compression processing and records the compressed composite image in the user area 28 or the memory card 29. The image processing unit 32 is an example of a recording unit that records the second image P2, to which the composition target O1 is composed, as a composite image for saving in the memory.

The operation of the configuration will be described referring to the flowchart shown in FIG. 4, usage examples of the portable terminal 10 of FIGS. 5 to 17, and the like. FIG. 5 shows a scene in which the user U performs imaging using the portable terminal 10.

The scene shown in FIG. 5 is s place where Mt. Fuji the user U goes on a travel is viewed, and at the place, there is a signboard 41 that displays an old logo 42 "FUJICOLOR and FUJIFILM". In the example, an example where the user U thinks of imaging of a composite photograph, in which two subjects of "Mt. Fuji" and the logo 42 "FUJICOLOR and FUJIFILM" are combined, based on similarity of a linguistic sense between "Mt. Fuji" and "FUJIFILM" at the place, and performs imaging using the portable terminal 10 will be described. In detail, the logo 42 of the example, a cosmetic character string indicating a product name "FUJICOLOR" and a combination of a cosmetic character string and a figure, in which a white character string indicating a company name "FUJIFILM" is displayed in white in a solid ellipse are displayed in two lines.

Figure 4:
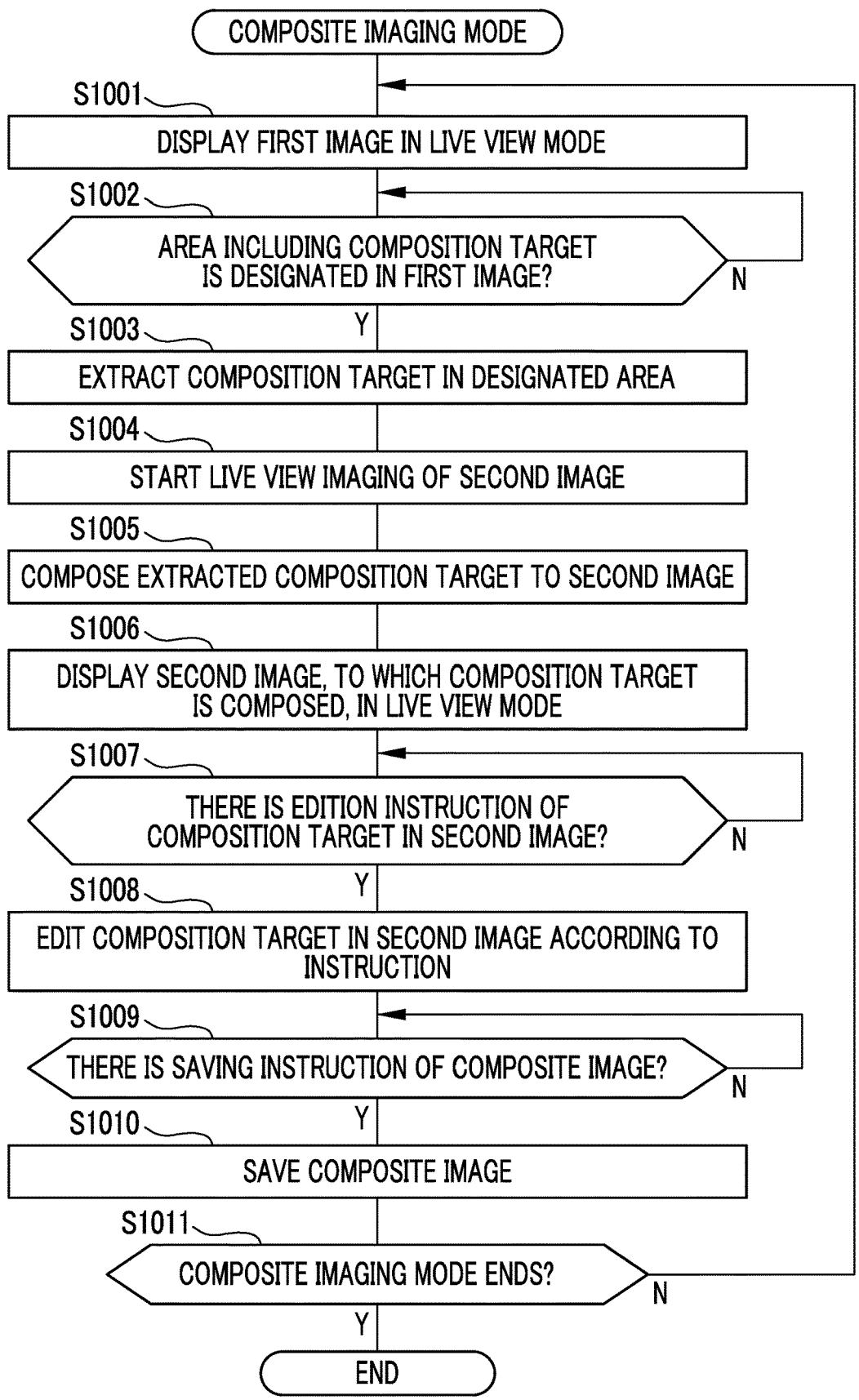
FIG. 4 is a flowchart showing a processing procedure of a composite imaging mode.
Figure 5:
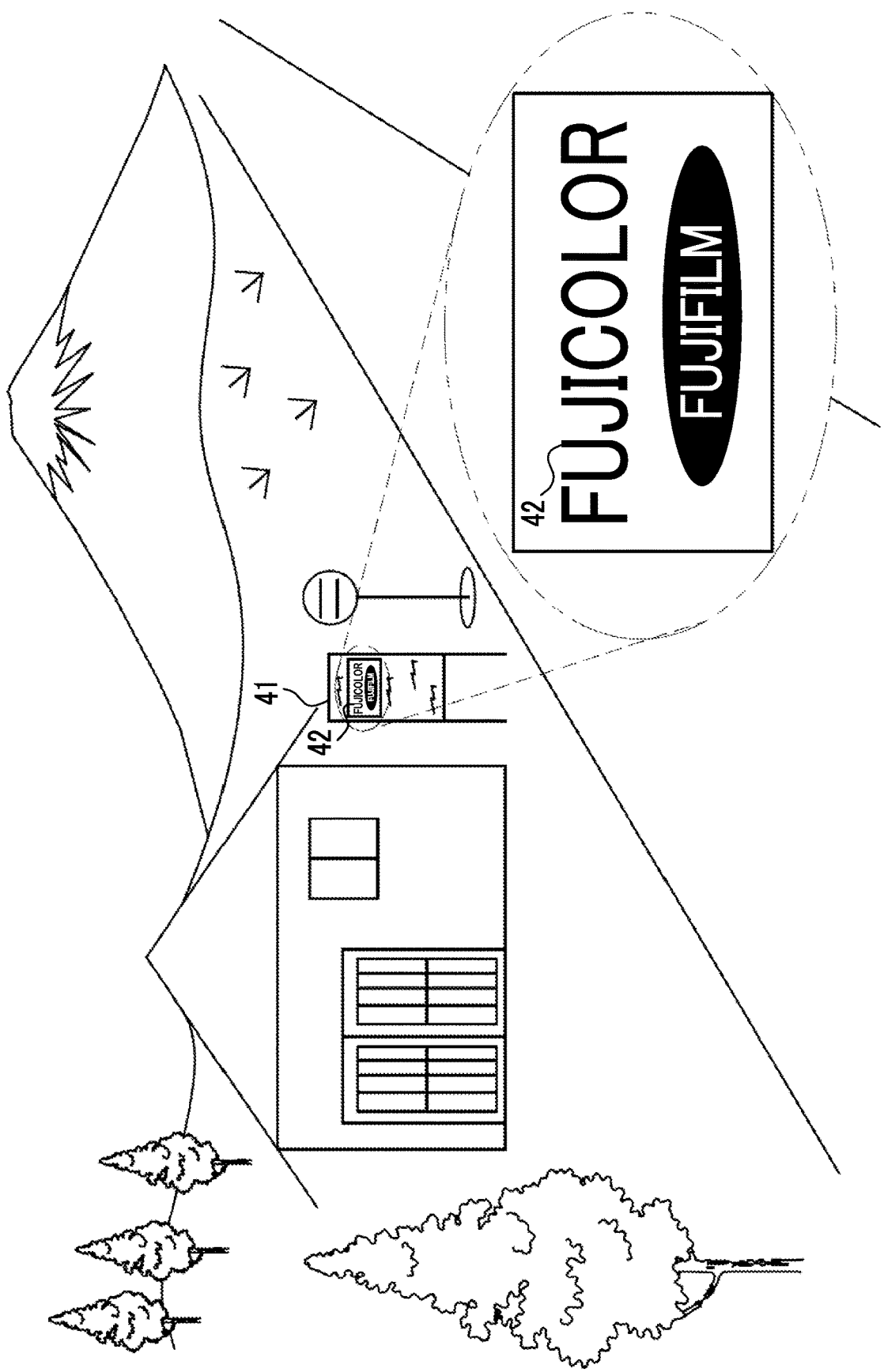
FIG. 5 is a diagram showing an example of a scene in which composite imaging is performed.

As shown in FIG. 4, in a case where the photograph composition application program is started in the portable terminal 10, the portable terminal 10 transits to a composite imaging mode. In the composite imaging mode, first, as shown in Step S1001, the live view imaging of the first image P1 is started in the imaging unit 11, and the live view display of the first image P1 is started in the touch panel display 12.

Figure 6:
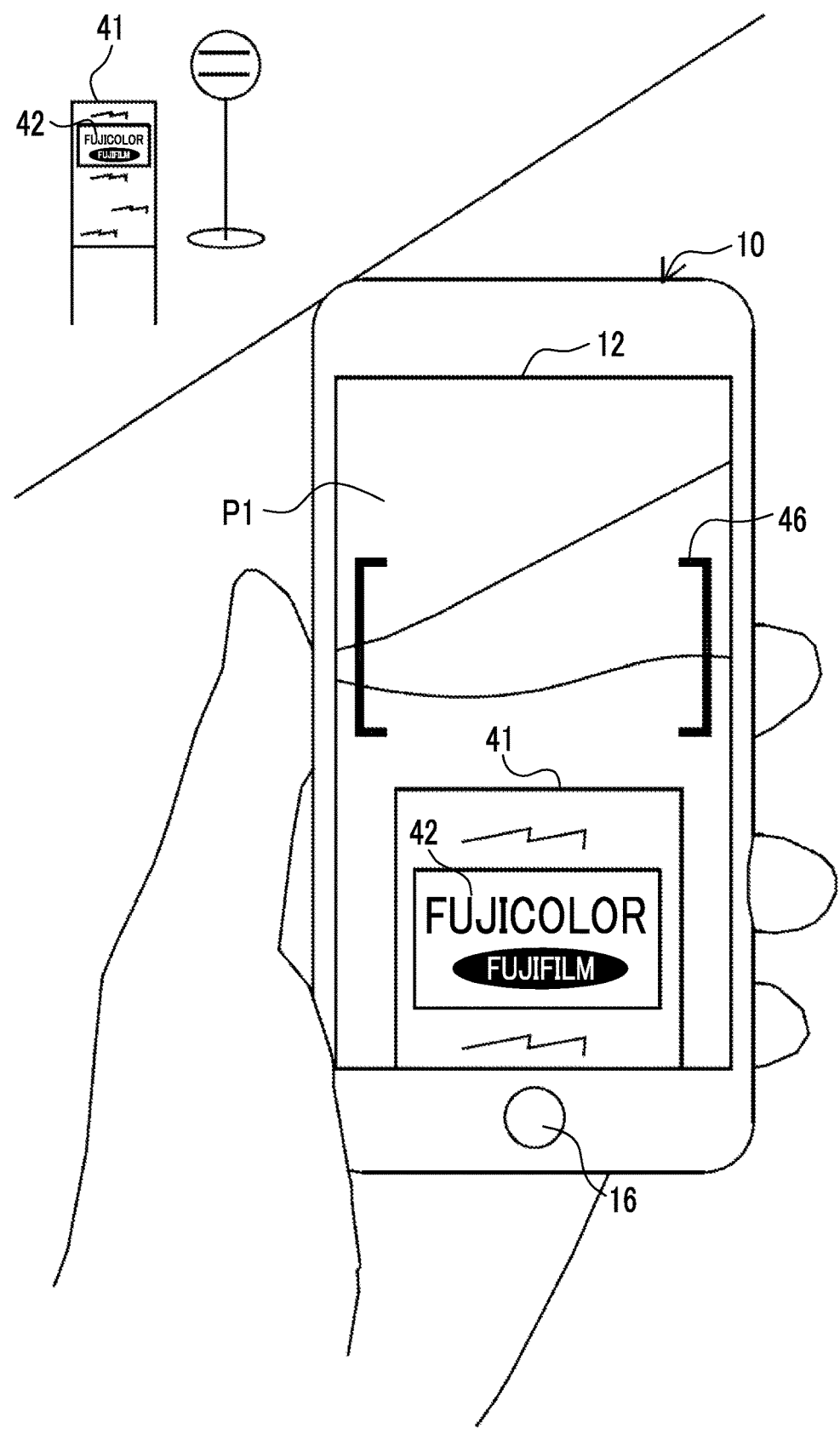
FIG. 6 is a diagram showing an aspect in which a first image is subjected to live view display.

As shown in FIG. 6, in the portable terminal 10, in a case where the live view display of the first image P1 is started, the display control unit 31 displays the target mark 46 on the first image P1 in a superimposed manner. The target mark 46 of the example has a pair of right and left brackets. Of course, the shape of the target mark 46 of the example is an example, and may have, for example, a rectangular grid-line or the like. The target mark 46 is arranged, for example, at the center of the display surface of the touch panel display 12.

In Step S1002, the portable terminal 10 waits for the designation of the extraction area for extracting the composition target O1 in the first image P1 in a state in which the target mark 46 is displayed.

Figure 7:
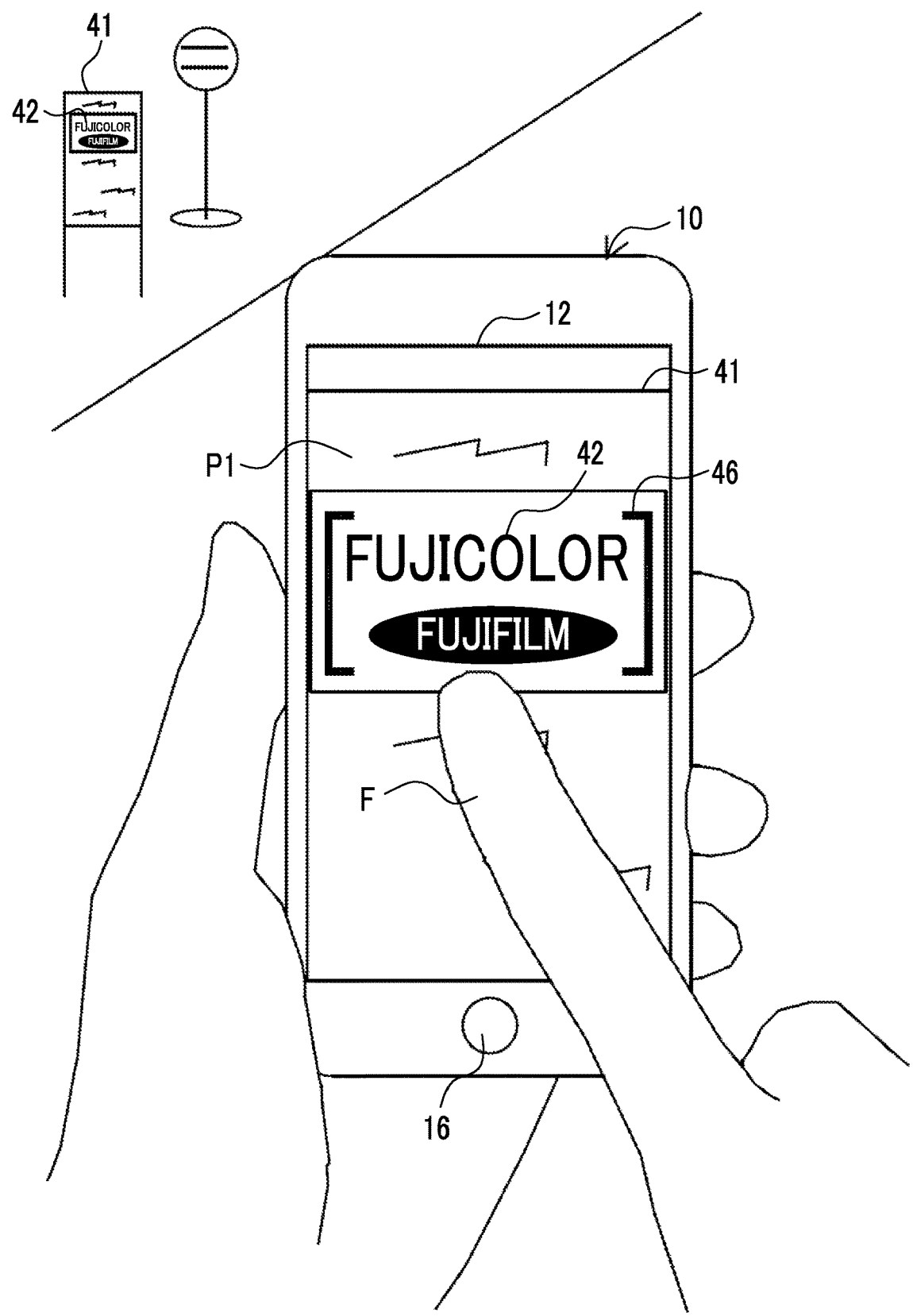
FIG. 7 is a diagram showing an aspect in which an area for extracting a composition target in the first image is designated.

In a case where the composition target O1 is decided, the user U decides the structural outline of the first image P1 such that the composition target O1 fits within the target mark 46. In the example, since the composition target O1 is the logo 42, as shown in FIG. 7, the structural outline of the first image P1 is decided such that the logo 42 is positioned at the center of the display screen in order to fit the logo 42 within the target mark 46. The decision of the structural outline is performed by moving the portable terminal 10 to adjust a relative positional relationship with a subject or in a case where the portable terminal 10 has a zoom function, using the zoom function.

As shown in FIG. 7, in a case where the periphery of the target mark 46 is tapped with a finger F in a state in which the logo 42 fits within the target mark 46 in the touch panel display 12, the main control unit 26 of the portable terminal 10 receives the tap operation as the designation operation of the extraction are of the composition target O1 (in Step S1002, Y). The main control unit 26 inputs coordinate information according to the position of the target mark 46 as information regarding the received designation operation to the extraction unit 32A. the coordinate information is, for example, coordinate information for defining a rectangular area surrounded by the target mark 46.

In Step S1003, the extraction unit 32A determines the rectangular area designated as the extraction area to be the designated area DA based on information regarding the designation operation input from the main control unit 26. The extraction unit 32A extracts the composition target O1 from the designated area DA, for example, using a contour extraction technique based on contrast. Specifically, the extraction unit 32A determines a boundary portion with large contrast to be the contour of the composition target O1 to be extracted based on contrast of pixels in the designated area DA.

Figure 8:
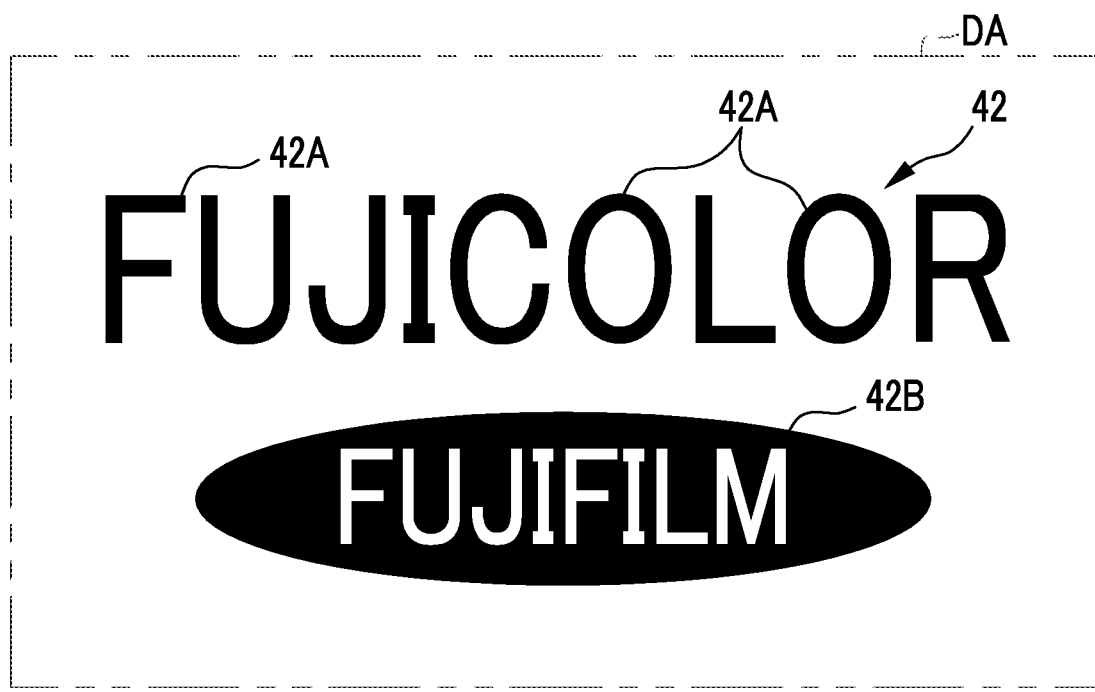
FIG. 8 is an explanatory view of an extraction method of the composition target.

As shown in FIG. 8, the logo 42 has a character string having a plurality of characters 42A and a figure, such as an ellipse 42B. A contour portion of the characters 42A and the ellipse 42B becomes a boundary portion with large contrast to a background. For this reason, the extraction unit 32A determines a boundary portion of the characters 42A and the ellipse 42B with the background in the designated area DA to be a contour portion of the characters 42A and the ellipse 42B to be extracted. Then, the extraction unit 32A extracts the characters 42A and the ellipse 42B along the determined contour.

The extraction unit 32A individually recognizes the contour of each of a plurality of characters 42A and the ellipse 42B. On the other hand, in regard to the relative positional relationship between a plurality of extracted characters 42A and the extracted ellipse 42B, the extraction unit 32A maintains a state in which of a plurality of characters 42A and the ellipse 42B are reflected in the first image P1, and handles the logo 42 having a plurality of characters 42A and the ellipse 42B as one composition target O1.

In the example, the characters "FUJIFILM" is put in white in the ellipse 42B. In regard to the white characters, the contour may not be determined. The reason is as follows: since the white characters in the ellipse 42B are different in color from the background, in a case where an image is extracted in the shape of the ellipse 42B, the white characters in the ellipse 42B can be identified. Of course, in regard to the white characters, the contour may be determined and a portion inside the contour may be excluded from the composition target O1. In this case, the white character portion in the composition target O1 of the extracted ellipse 42B becomes transparent.

Figure 9:
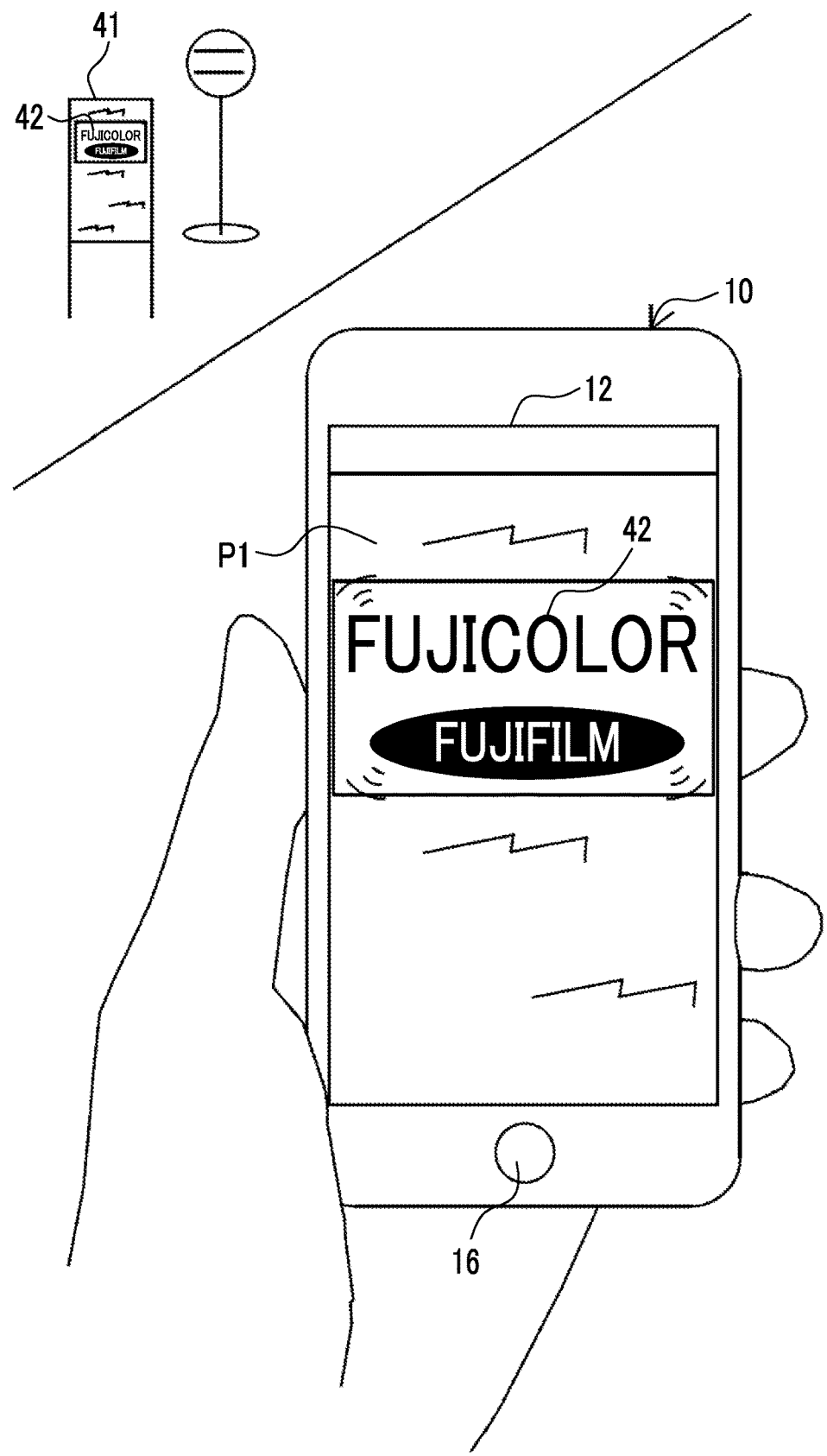
FIG. 9 is a diagram showing a state immediately after the composition target is extracted.

As shown in FIG. 9, in a case where the extraction unit 32A extracts the logo 42 as the composition target O1 from the first image P1, the display control unit 31 performs a visual performance for identifying the extracted logo 42 as the composition target O1 and the background of the first image P1 as an extraction source in the touch panel display 12. In an example shown in FIG. 9, visual vibration for magnifying and reducing the logo 42 little by little for a time set in advance is performed as the visual performance With this, since the extracted logo 42 seems to float from the background of the first image P1 as an extraction source, the user U can clearly recognize that the logo 42 is extracted as the composition target O1. As the visual performance other than vibration, a state in which the extracted composition target O1 is displayed on a magnified scale for a time set in advance may be continued. In addition, a visual performance in which the extracted composition target O1 is flickered or the color is changed may be employed.

In a case where the composition target O1 is extracted, as shown in Step S1004, the imaging unit 11 instantly starts the live view imaging of the second image P2. In a case where the live view imaging of the second image P2 is started, in Step S1005, the composition unit 32B composes the extracted composition target O1 to the second image P2. Then, in Step S1006, the display control unit 31 subjects the second image P2, to which the composition target O1 is composed, to the live view display in the touch panel display 12.

Figure 10:
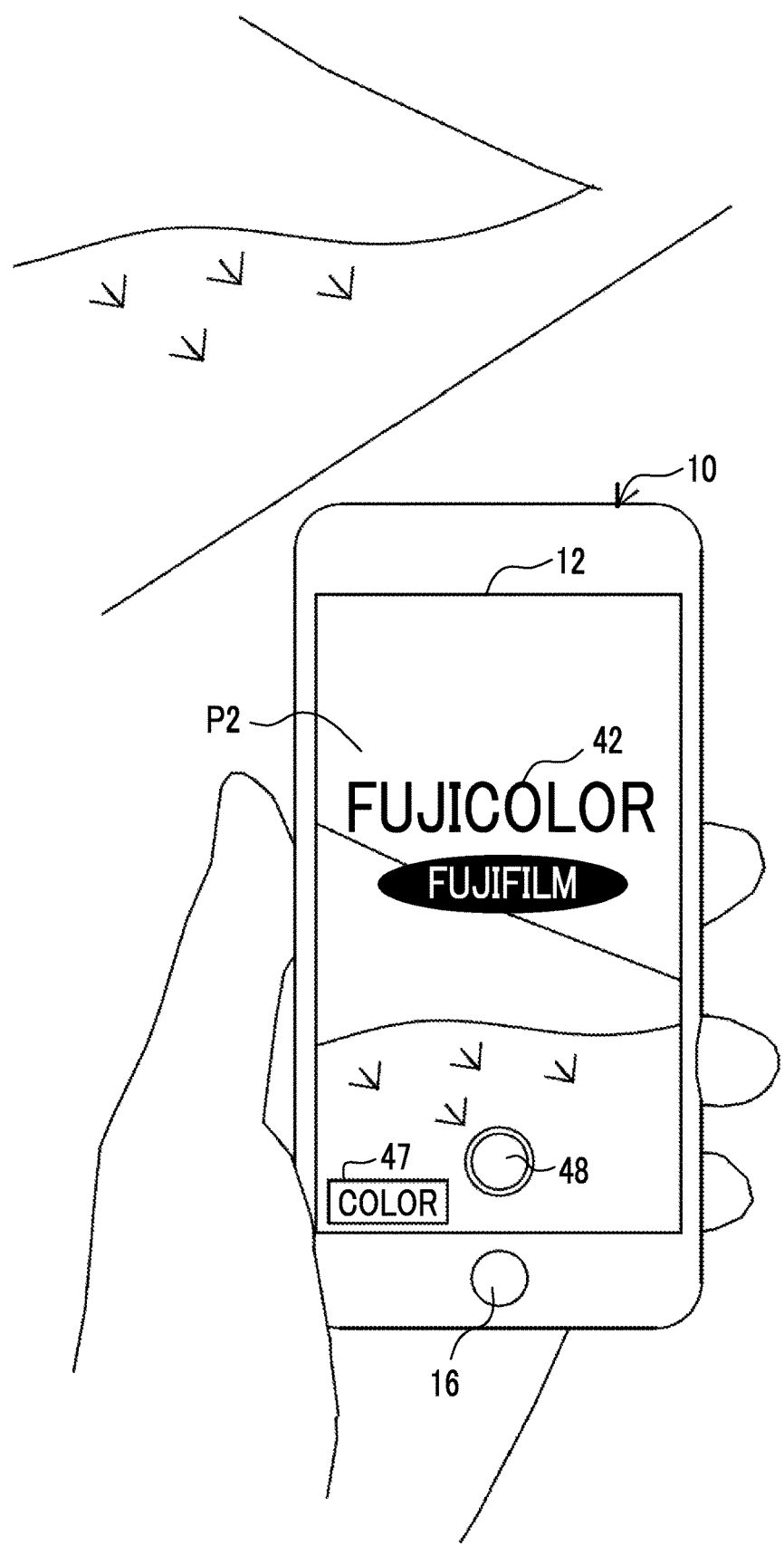
FIG. 10 is a diagram showing an aspect in which a second image is subjected to live view display.

FIG. 10 shows an aspect in which the second image P2, to which the logo 42 as the composition target O1 is composed, is subjected to the live view display. As shown in FIG. 10, in subjecting the second image P2, to which the composition target O1 is composed, to the live view display, the display control unit 31 displays the logo 42 at the center of the display screen of the touch panel display 12 in the initial state. In addition, the display control unit 31 displays a color change button 47 and a shutter button 48, for example, at positions below the display screen of the touch panel display 12 as a GUI. As described below, the color change button 47 is an operation button that is used to change the color of the composition target O1. The shutter button 48 is an operation button that is used to input the image saving instruction, and is an operation button that is used to save the second image P2, to which the composition target O1 is composed, as a composite image for saving.

The user U decides the structural outline of the second image P2 and the relative positional relationship between the subject and the second image P2 and the composition target O1 while viewing the live view display of the second image P2, to which the composition target O1 is composed in this way.

Figure 11:
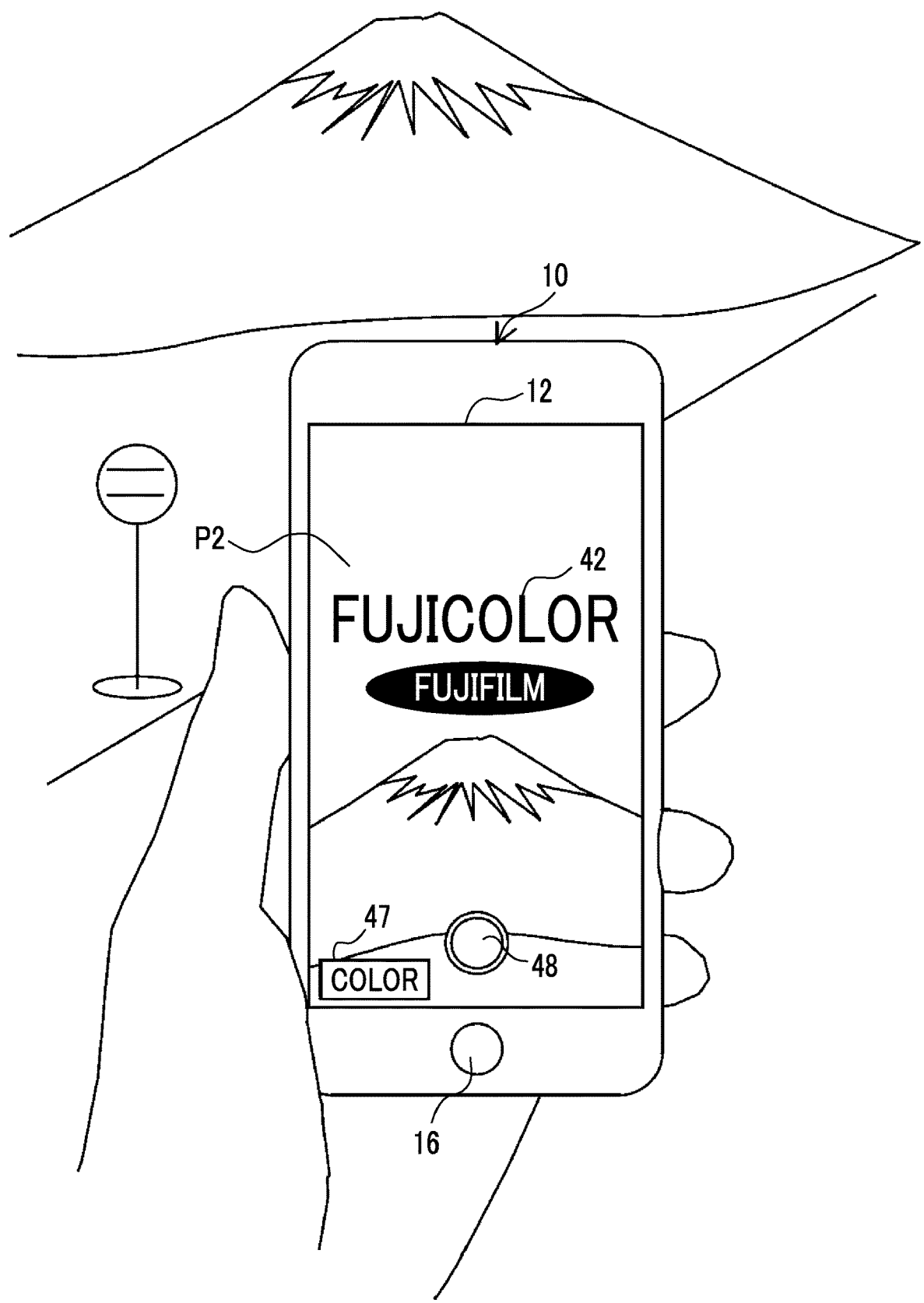
FIG. 11 is a diagram showing an aspect in which a structural outline of the second image is decided.

Specifically, as shown in FIG. 11, in the example, the user U is thinking about capturing a composite photograph in which the logo 42 "FUJICOLOR and FUJIFILM" and "Mt. Fuji" are combined. For this reason, the user U adjusts the position and direction of the portable terminal 10 such that "Mt. Fuji" is reflected as the subject of the second image P2. Then, a position, a size, an angle of view, or the like of "Mt. Fuji" in the second image P2 are adjusted. With such an operation, the user U decides the structural outline of the second image P2.

In parallel with the decision of the structural outline of the second image P2, the user U decides the relative positional relationship between "Mt. Fuji" as the subject of the second image P2 and the logo 42 as the composition target O1. In this case, edition of the display position, the display posture, the display size, the display color, and the like of the logo 42 as the composition target O1 is performed.

Figure 12:
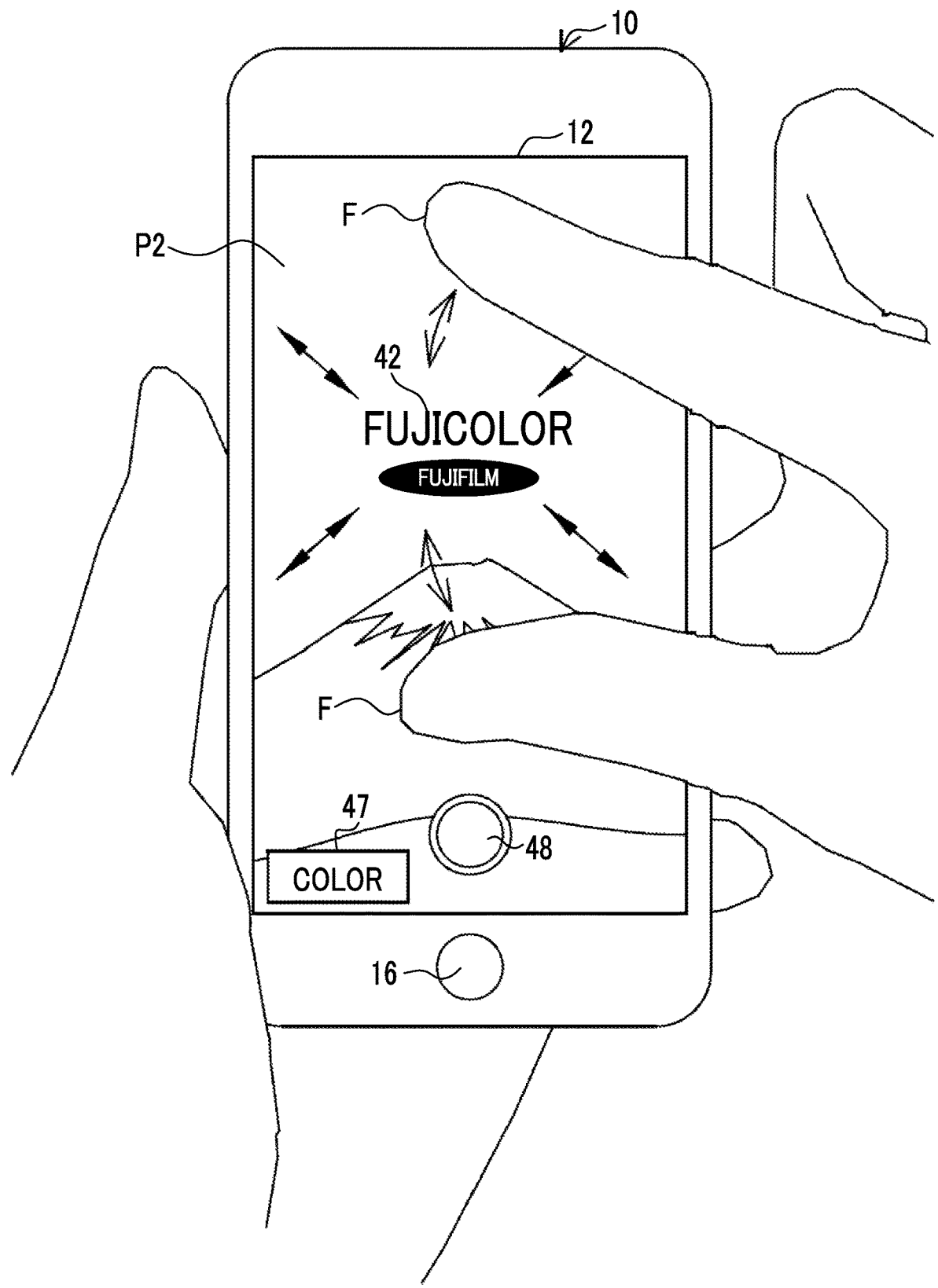
FIG. 12 is a diagram showing a magnification and reduction operation of the composition target.
Figure 13:
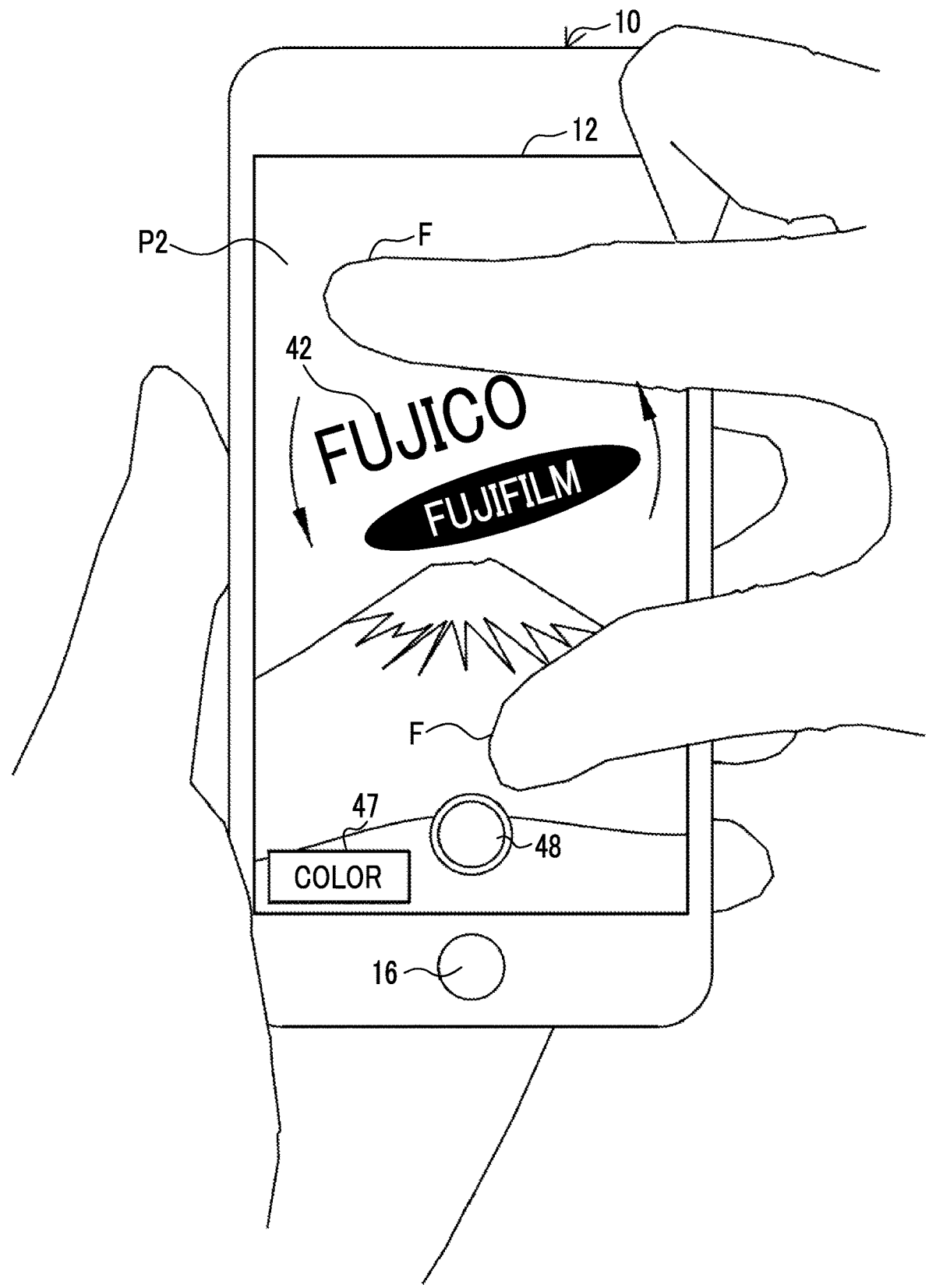
FIG. 13 is a diagram showing a rotation operation of the composition target.
Figure 14:
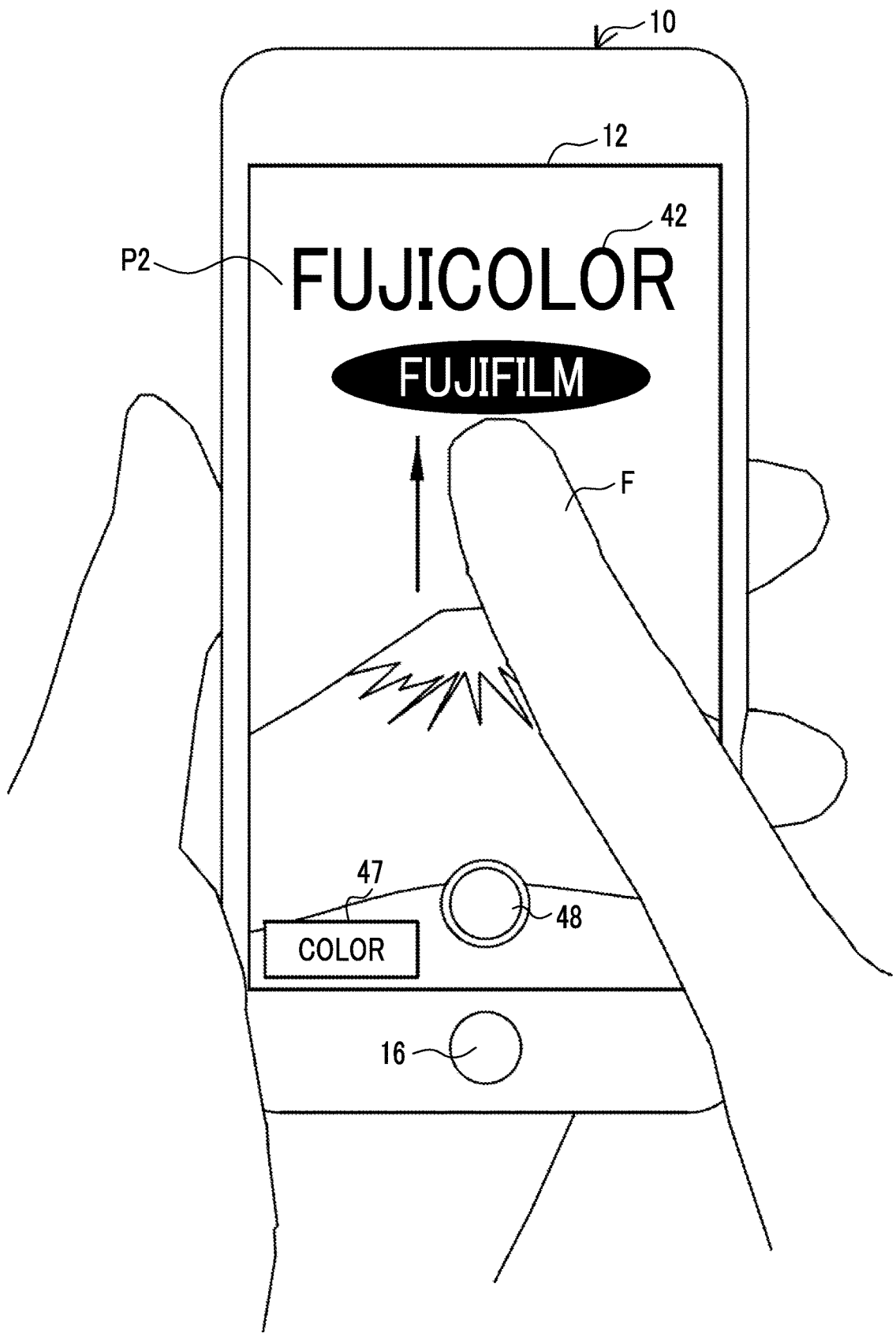
FIG. 14 is a diagram showing a movement operation of the composition target.

In Step S1007, the main control unit 26 waits for an input of an edition instruction of the composition target O1 in the second image P2. In a case where the edition instruction is input (in S1007, Y), the process progresses to S1008, and the image processing unit 32 edits the composition target O1 in the second image P2 according to a detail of the edition instruction. FIGS. 12 to 14 are examples of the edition instruction.

FIG. 12 shows an edition instruction to magnify and reduce the display size of the logo 42 as the composition target O1. In a case of magnifying and reducing the display size, for example, magnification and reduction are performed by a gesture, such as pinch-out or pinch-in. Pinch-out is a gesture in which the user extends the interval between two fingers F in a state of touching the display screen with the two fingers F in the touch panel display 12. In a case where the user performs pinch-out in a state of touching the upper and lower sides or the right and left sides of the logo 42 with the two fingers F, the display size of the logo 42 is magnified. In contrast to pinch-out, pinch-in is a gesture in which the user narrows the interval between the two fingers F. In a case where pinch-in is performed, the display size of the logo 42 is reduced.

FIG. 13 shows an example of an edition instruction to change the display gesture of the logo 42 as the composition target O1, and an example where the logo 42 is rotated. In a case of rotating the logo 42, the user U performs a gesture to rotate the two fingers F while maintaining the interval between the two fingers F in a state of touching the upper and lower sides or the right and left sides of the logo logo 42 with the two fingers F in the touch panel display 12.

FIG. 14 shows an edition instruction to move the display position of the logo 42 as the composition target O1. In a case of moving the display size of the logo 42, the user U performs a gesture to slide a finger F in a direction desired to be moved in a state of touching the logo 42 with the finger F in the touch panel display 12. Such a gesture is referred to as a swipe.

In a case where the color change button 47 is tapped, a palette (not shown) for selecting a display color is displayed. A plurality of colors are arrayed in the palette, and in a case where a desired color is designated from among a plurality of colors, the display color of the logo 42 is changed to the designated color. In a case where the color change button 47 is tapped with the finger F, the display color may be changed among a plurality of colors determined in advance according to the number of times, in which the color change button 47 is tapped, such as white and black, white and red, or white, black, and red. The color change is performed for the purpose of avoiding the composition target O1 from being hardly viewed since the color of the composition target O1 overlaps the color of the background. Alternatively, the color change may be performed for the purpose of changing the color of the composition target O1 in conformity with the color of the background based on the sensibility of the user U.

The main control unit 26 receives such a gesture to the composition target O1 as the edition instruction. The main control unit 26 is an example of a second designation reception unit that receives the edition instruction of the composition target O1 in the second image P2 during the live view display of the second image P2. The main control unit 26 transmits the received edition instruction to the composition unit 32B. The composition unit 32B edits the composition target O1 in the second image P2 based on the received edition instruction.

Figure 15:
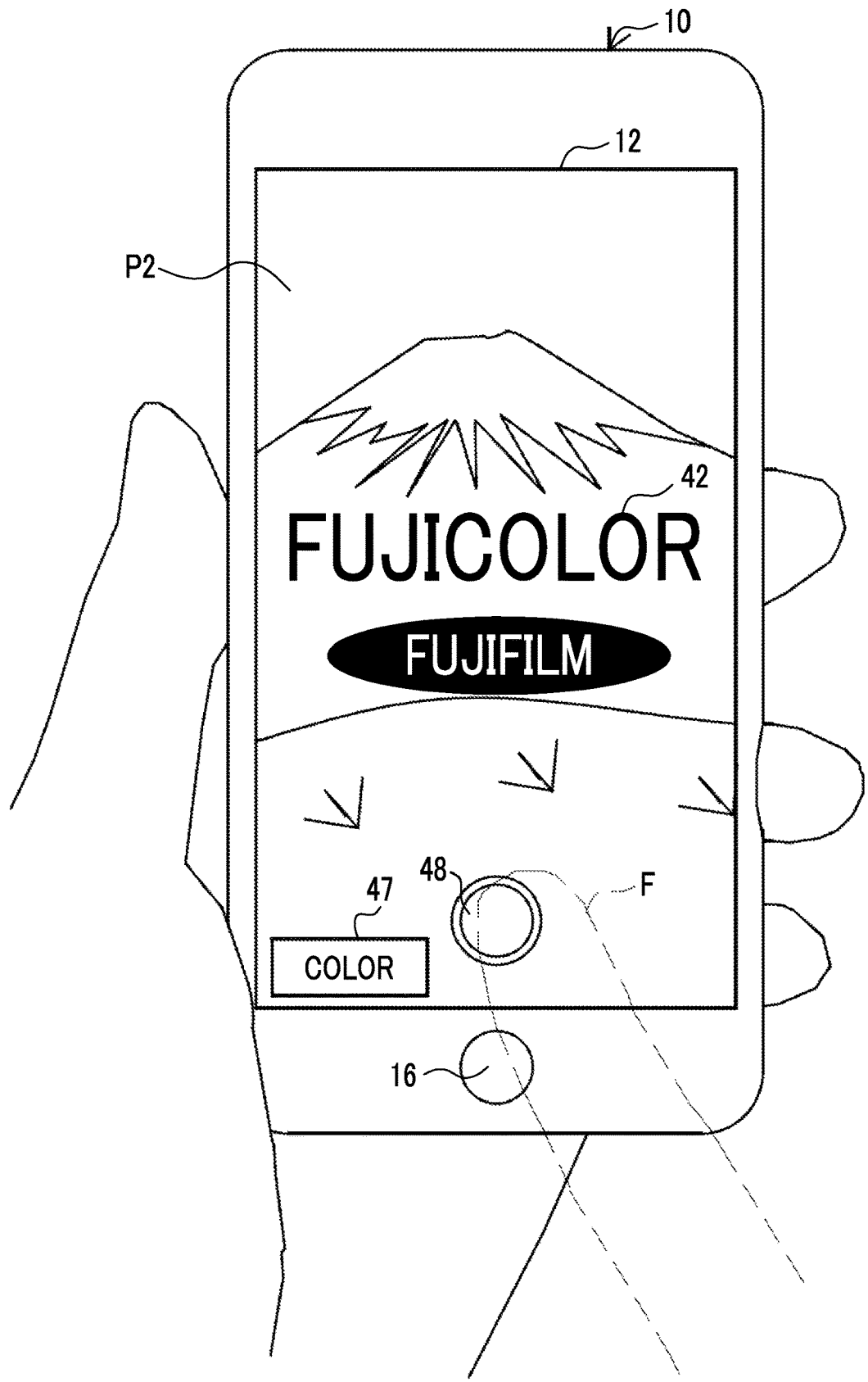
FIG. 15 is a diagram showing an operation of an image saving instruction.

In the example, for example, as shown in FIG. 15, the decision of the structural outline of the second image P2 and the edition of the logo 42 are performed such that the logo 42 is arranged below a snow-capped peak of Mt. Fuji against the background of "Mt. Fuji" in the second image P2.

In Step S1009, the main control unit 26 waits for the image saving instruction of the composite image in which the logo 42 as the composition target O1 and the second image P2 are composed. As shown in FIG. 15, in a case where the shutter button 48 is tapped with the finger F during the live view display of the second image P2, the main control unit 26 receives the tap operation of the shutter button 48 as the image saving instruction of the composite image.

In a case where the image saving instruction of the composite image is input (in Step S1009, Y), the composition unit 32B establishes the second image P2 captured at the timing at which the shutter button 48 is tapped and establishes the display position and the like of the logo 42 in the established second image P2. The composition unit 32B composes the logo 42, for which the display position and the like are established, to the established second image P2 and outputs the second image P2 as a composite image for saving to the image memory 17A. The image processing unit 32 subjects the composite image for saving output from the image memory 17A to the compression processing. The image processing unit 32 records the compressed composite image in the user area 28 of the storage device 18 or the memory card 29 to save the composite image (Step S1010).

Figure 16:
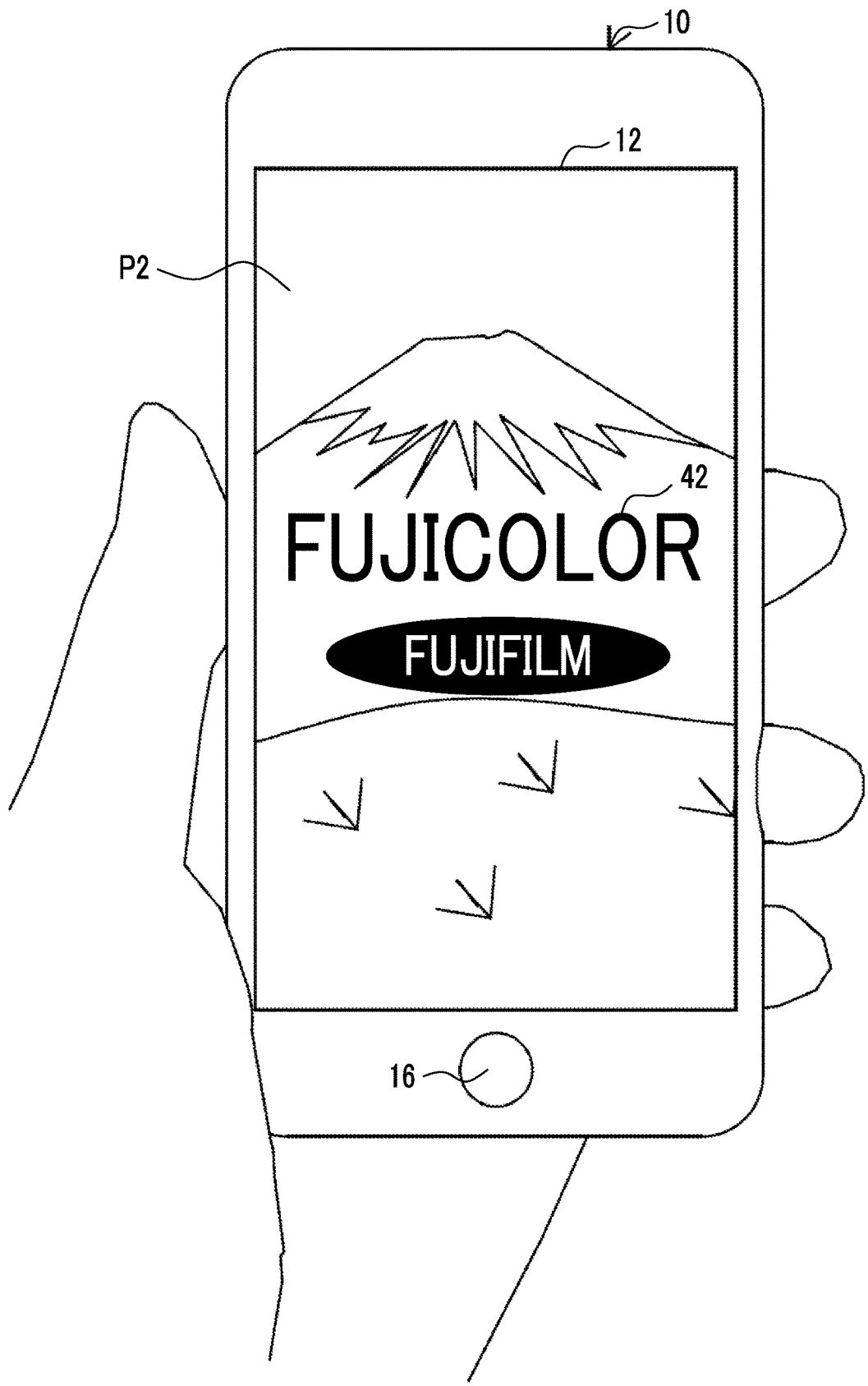
FIG. 16 is a diagram showing post view display of a composite image.

As shown in FIG. 16, in a case where the composite image is saved, the display control unit 31 displays the composite image to be saved on the touch panel display 12 as a still image for a time set in advance. With this, the user U can confirm the structural outline of the subject of the second image P2 and the display position and the like of the logo 42 in the composite image.

The portable terminal 10 repeats the processing of Steps S1001 to S1010 until the composite imaging mode ends (in Step S1011, Y).

Figure 17:
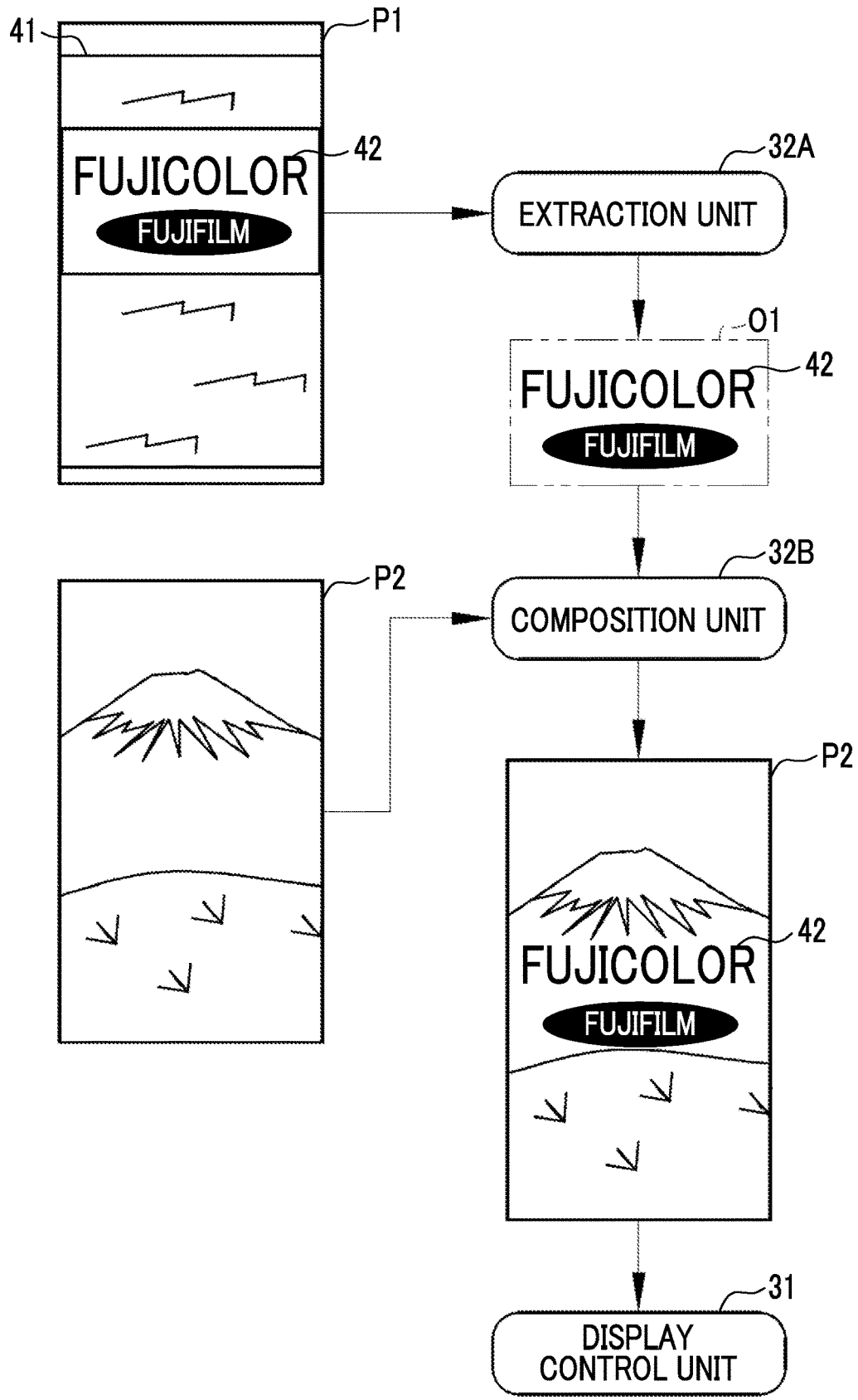
FIG. 17 is an abstract diagram of a first example of composite imaging.

FIG. 17 is a diagram summarizing the processing of the portable terminal 10 in the composite imaging mode. In summary, in the portable terminal 10, the extraction unit 32A extracts, as the composition target O1 for image composition, the logo 42 as a part of the first image P1 from the first image P1 subjected to the live view display as the through image. Then, the composition unit 32B composes the composition target O1 (logo 42) to the second image P2 captured by the imaging unit 11 and different from the first image P1, and the display control unit 31 subjects the second image P2, to which the composition target O1 is composed, to the live view display.

In this way, with the portable terminal 10, it is possible to extract a specific subject in the first image P1 desired by the user U as the composition target O1, instead of the whole first image P1. As a result, it is possible to exclude an unnecessary subject undesired by the user U from the composition target O1.

With the portable terminal 10, the second image P2 that is composed with the composition target O1 extracted from the first image P1 is subjected to the live view display in an aspect in which the composition target O1 is composed. For this reason, the user U can select a subject to be combined with the composition target O1 in the second image P2 while confirming the composition state of the subject of the second image P2 and the composition target O1 through the live view display, such as the structural outline of the second image P2 and the position of the composition target O1 to be inserted into the second image P2.

For this reason, the portable terminal 10 as an example of an imaging apparatus of the present disclosure can increase a degree of freedom relating to decision of a subject to be reflected in a composite image, compared to a multiple exposure imaging technique of the related art in which all of a plurality of images are composed.

In the above-described example, the extraction unit 32A determines the contour of a mark or a character string (for example, the logo 42) in the first image P1 and extracts the mark as the composition target O1 along the determined contour. For this reason, for example, it is possible to exclude an unnecessary subject to be reflected in the background of the mark or the character string, compared to a case where a rectangular area including the mark or the character string and the background is extracted as the composition target O1.

In the above-described example, the first image P1 is an image captured by the imaging unit 11, and is an image that is subjected to the live view display on the touch panel display 12. Since the composition target O1 can be extracted from such a first image P1, the user U easily extracts an impressive mark, character string, or the like viewed by the user U as the composition target O1 in an environment in which the user U exists, such as a travel destination.

The main control unit 26 as an example of a first designation reception unit receives the designation of the composition target O1 during the live view display of the first image P1. For this reason, since the user U can designate the composition target O1 confirming the display size, the display position, and the like of the composition target O1 in the first image P1 through the live view display, the user easily selects the composition target O1.

After the composition target O1 is extracted from the first image P1 during the live view display, the display control unit 31 starts the live view display of the second image P2 to which the extracted composition target O1 is composed. For this reason, a display switching operation or the like from the first image P1 to the second image P2 is not needed, and an operation is simple.

The portable terminal 10 can save the second image P2, to which the composition target O1 is composed, as the composite image. With this, since the user U can appreciate the composite image later or can send the composite image to an acquaintance, enjoyment is broadened.

The main control unit 26 as an example of a second designation reception unit receives the edition instruction of the composition target O1 in the second image P2 during the live view display of the second image P2. Since the relative positional relationship between the subject of the second image P2 and the composition target O1 can be confirmed, the edition of the composition target O1 is easily performed.

In the above-described example, as the composition target O1, the logo 42 that is an example of the mark including the characters has been described as an example. Specifically, an example where an idea is conceived from similarity of a linguistic sense between "FUJICOLOR and FUJIFILM" and "Mt. Fuji", and the composite photograph in which the two subjects of the logo 42 "FUJICOLOR and FUJIFILM" and "Mt. Fuji" are composed is captured has been described. Such an imaging action responds to a user's request for imaging characters and another subject related to the characters in combination, instead of a request for imaging any one subject.

Such an imaging action is not limited to an action of deciding the subject of the second image P2 to be combined with the characters starting with the characters selected as the composition target O1, and can prompt the user for a creative imagination regarding a combination of the two subjects, such as the layout of the characters in the second image P2, the structural outline of the second image P2 in conformity with the characters, and the like. Such an imaging action is a way of enjoying photographing and an action that can also be referred to as a new imaging experience.

A method called a collage that uses a plurality of previously captured photographs as materials and combines the materials to create a composite photograph is known in the related art. However, an imaging experience that is provided by a photograph composition function of the portable terminal 10 is different from a collage of previous photographs as follows.

That is, with the photograph composition function of the portable terminal 10, in an environment in which the user exists, such as a travel destination, the user can take an action of clipping impressive characters from the environment according to a user's feeling at the time and an atmosphere at the time. In addition, the user can find a subject fit to the characters with the sensibility of the user starting with the clipped characters and can capture a composite photograph, in which both of the subject and the characters are combined, on the spot. So to speak, such an imaging experience should be referred to as an instant photograph collage in conformity with the current environment and sensibility of the user, and such a way of enjoying photographing is referred to a wholly new imaging experience clearly different from the photograph collage in the related art.

Figure 18:
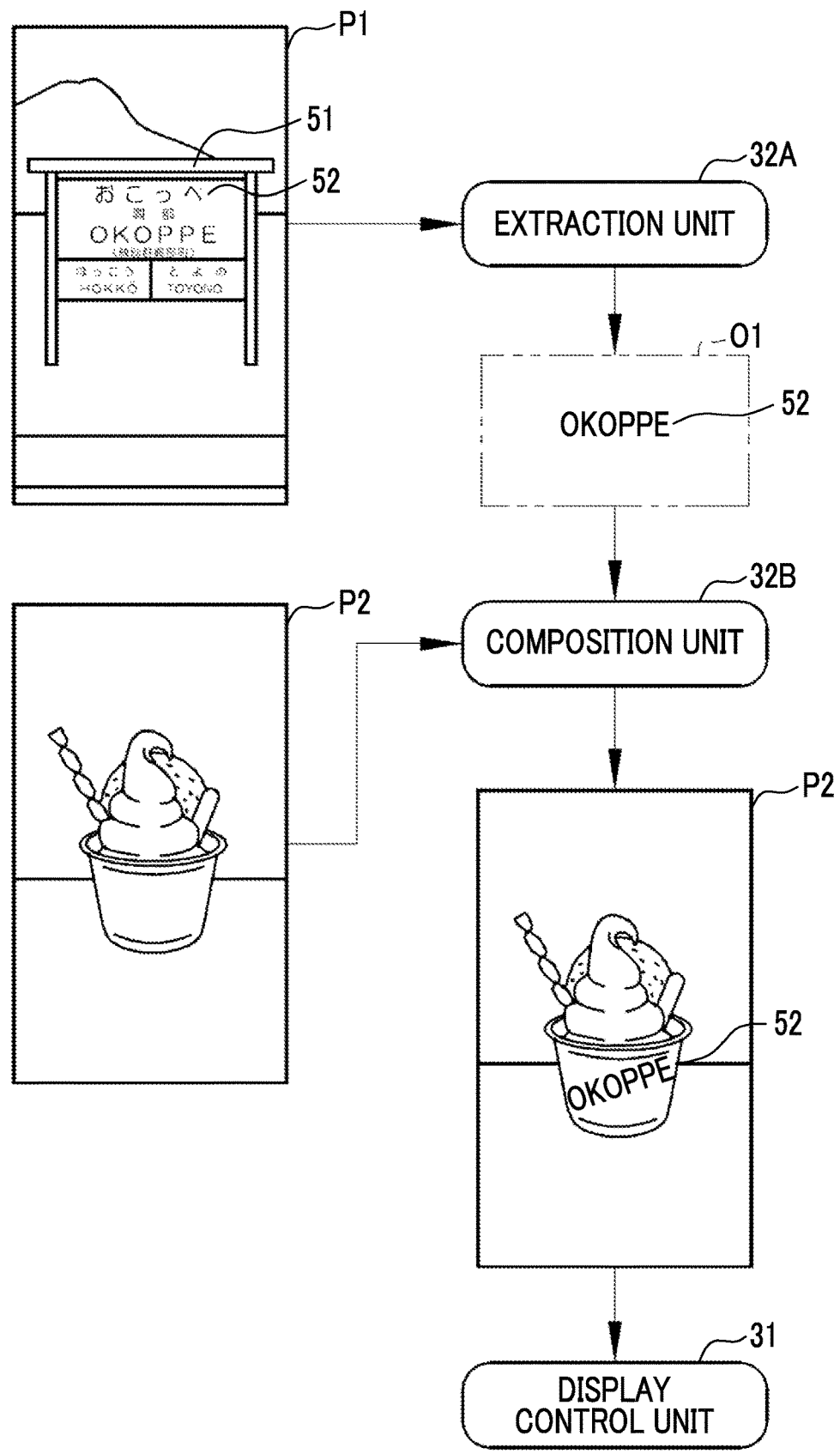
FIG. 18 is an abstract diagram of a second example of composite imaging.
Figure 19:
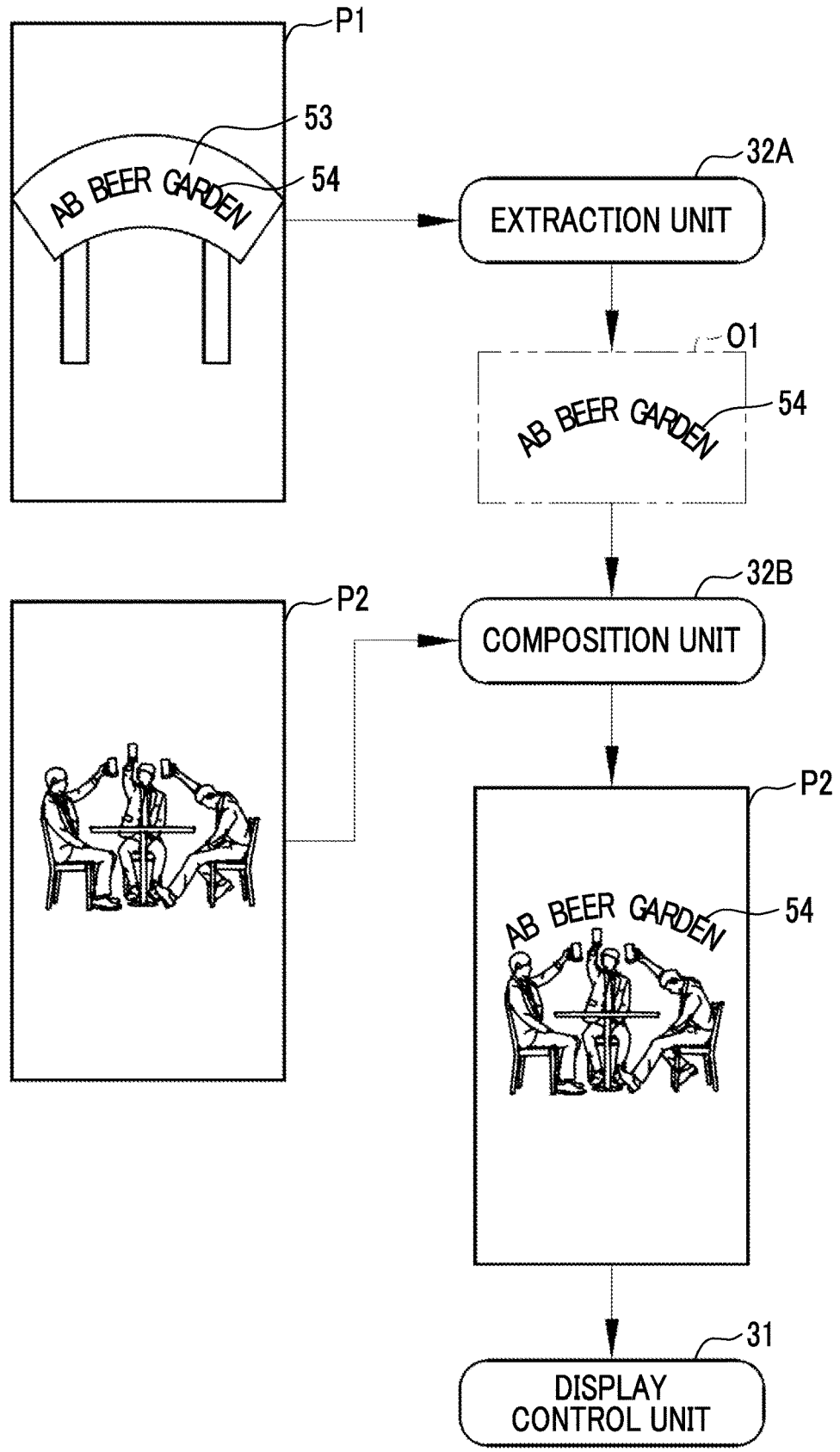
FIG. 19 is an abstract diagram of a third example of composite imaging.
Figure 20:
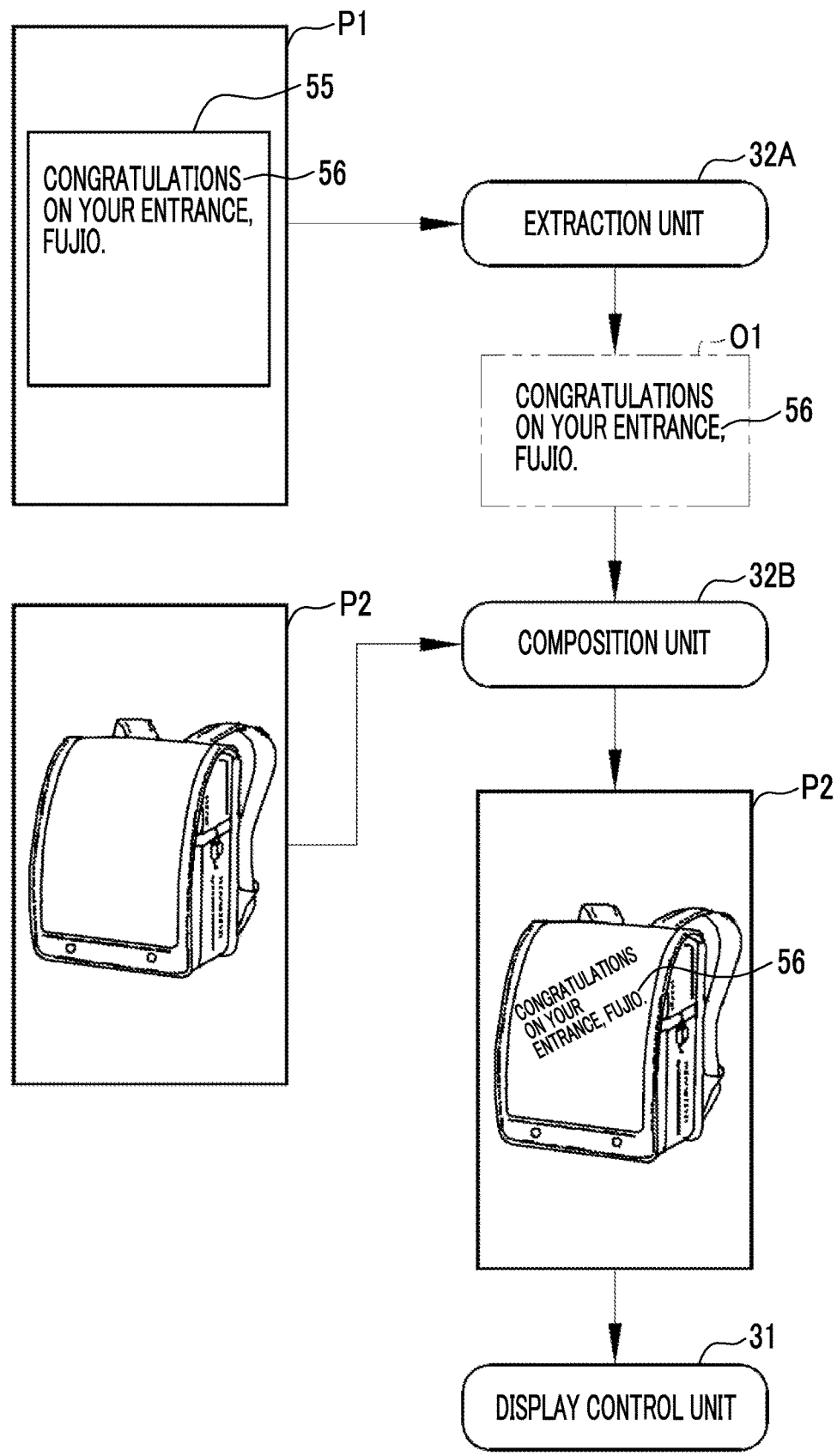
FIG. 20 is an abstract diagram of a fourth example of composite imaging.

FIGS. 18 to 20 show an example regarding how to enjoy photographing that is provided by the portable terminal 10, other than the above-described example. The example shown in FIG. 18 is an example where a composite photograph, in which a logo 52 "OKOPPE" that is a station name of a travel destination of the user and "ice cream" that the user has eaten at there are combined, is captured. In the example shown in FIG. 18, a display board 51 that displays a station name provided on a platform is captured as a first image P1, and a logo 52 of a character portion "OKOPPE" is extracted from the display board 51 as a composition target O1. Then, a second image P2 with "ice cream" as a subject is captured, and the logo 52 of the composition target O1 is composed to the second image P2.

In this way, in a case where the photograph composition function of the portable terminal 10 is used, a composite photograph, in which the logo 52 that is the station name of the travel destination "OKOPPE" and "ice cream" that the user has eaten there are composed, is captured, whereby a way of enjoying in which two related memories are superimposed on one photograph and left becomes possible. Moreover, with the portable terminal 10, it is possible to instantly create a composite photograph at a travel destination without performing a work for making a collage of a plurality of photographs after returning from a travel. Since it is possible to instantly leave strongly impressive memories at the travel destination as a composite photograph, the user easily leaves the strongly impressive memories in a vivid form, compared to a case where the user edits the captured photographs after returning from the travel. An album of the travel in which a plurality of such composite photographs are collected is created, whereby it is possible to save the composite photographs in such a form that the user always memories the impression and atmosphere at the time at the travel destination.

The example shown in FIG. 19 is an example where, when the user goes to a beer garden with colleagues, a composite photograph, in which a logo 54 that is a store name "AB BEER GARDEN" of the bear garden and the colleagues who are toasting are combined, is captured. In the example shown in FIG. 19, a signboard 53, on which the logo 54 of the store name, is captured as a first image P1, and the logo 54 "AB BEER GARDEN" is extracted from the first image P1 as a composition target O1. Thereafter, a second image P2 with the colleagues during toasting as a subject is captured, and the logo 54 of the composition target O1 is composed to the second image P2.

In this way, in a case where the photograph composition function of the portable terminal 10 is used, the composite photograph, in which the logo 54 of the store name "AB BEER GARDEN" and the colleagues during toasting at the store are composed, is captured, whereby a way of enjoying in which two related memories are superimposed on one photograph and left becomes possible similarly to FIG. 18.

Moreover, in the example shown in FIG. 19, the logo 54 "AB BEER GARDEN" is arranged in an arc shape as a whole, and a way of holding a hand up and a posture of each of the colleagues during toasting is adjusted in conformity with the arc shape. Specifically, the position of the hand of a person at the center among three people is the highest, and the position of the hand of each of the two people on both sides is slightly lowered in conformity with the arc shape of the logo 54. The position and posture of a head of each of the two people on both sides are adjusted in conformity with the arc shape of the logo 54.

In capturing the composite photograph, the logo 54 "AB BEER GARDEN" is extracted from the first image P1 and is subjected to live view display in a state of being composed with the second image P2. As in the example, in a case where a subject that is reflected in the second image P2 is a person, the user who operates the portable terminal 10 to perform imaging and the subject take communication, for example, "Hold the hand up higher", "Lower the head", or "Stoop". In this way, the user can also decide posing of the subject in conformity with the shape of the logo 54 while taking communication with the subject. It can be said that such an example shown in FIG. 19 is also an example of a new way of enjoying of photographing or a new imaging experience.

The example shown in FIG. 20 is an example where a composite photograph, in which a message 56 showing handwritten words of congratulations of "CONGRATULATION ON YOUR ENTRANCE, FUJIO." and "backpack" are combined, is captured. In the example shown in FIG. 20, a memo 55 on which the message 56 is written is captured as a first image P1, and the message 56 of "CONGRATULATION ON YOUR ENTRANCE, FUJIO." is extracted from the first image P1 as a composition target O1. Then, a second image P2 with "backpack" as a subject is captured, and the message 56 of the composition target O1 is composed to the second image P2. In the composition of the message 56, the posture and the display size of the message 56 are edited such that the message 56 fits in a portion of a lid of the backpack.

In this way, in a case where the photograph composition function of the portable terminal 10 is used, the message 56 and the related subject are composed, whereby it is also possible to simply create a composite photograph, such as a message card. The message 56 is an example of a character string reflected in the first image P1. Like the combination of the message 56 of "CONGRATULATION ON YOUR ENTRANCE" and the related backpack shown in FIG. 20, a composite photograph, in which an important letter and a related subject are superimposed, is considered to become a photograph with a lot of memories in the future. With the portable terminal 10, it is possible to simply leave such a composite photograph.

Modification Example 1

Figure 21:
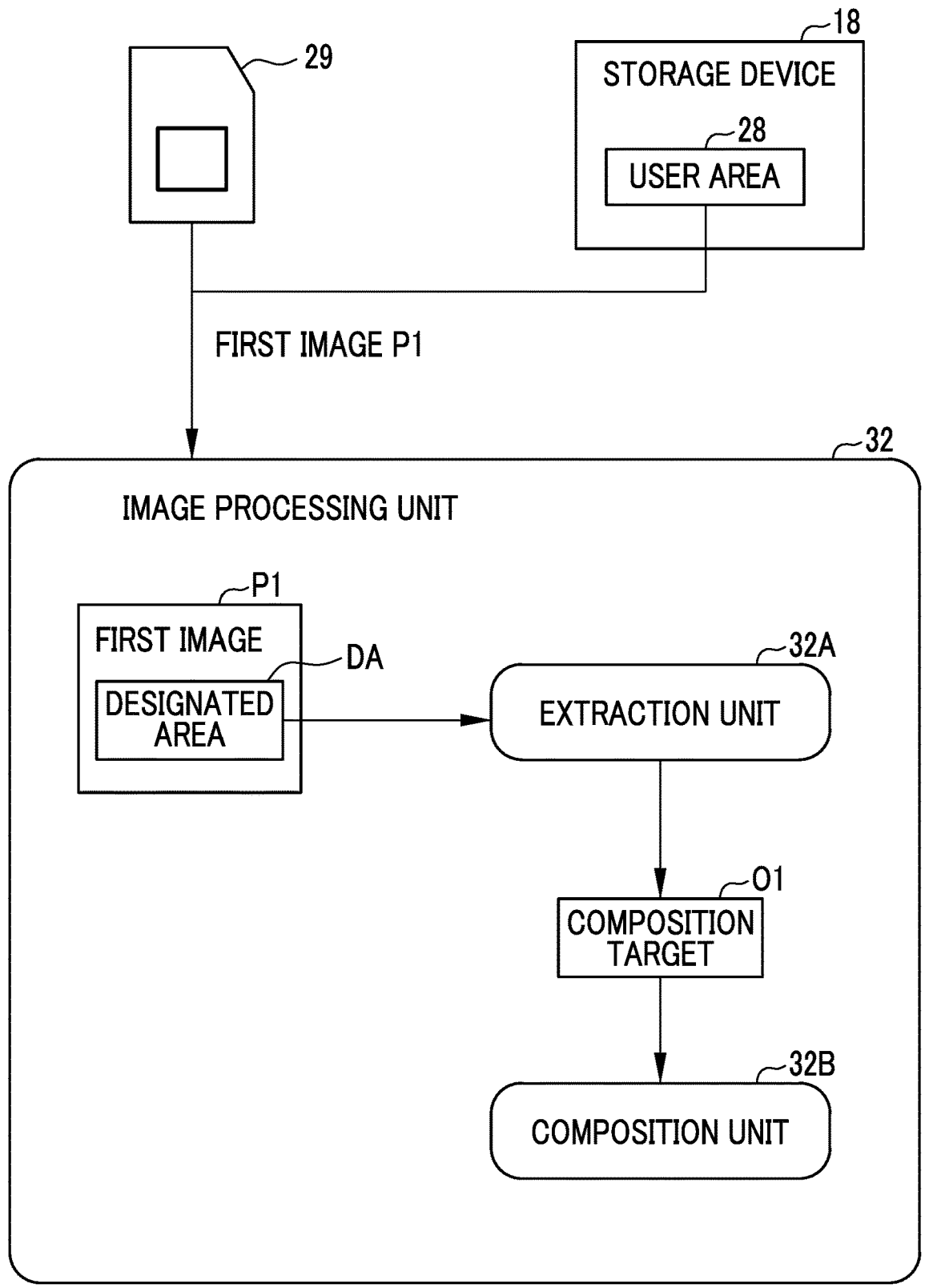
FIG. 21 is a diagram showing a modification example where the first image is read from a memory.

In the above-described example, although an example where not only the second image P2 but also the first image P1 is a through image capable of being subjected to the live view display has been described, as shown in FIG. 21, the first image P1 may not be a through image. That is, the first image P1 may be an image that is read from among captured images previously captured and saved in the memory card 29, the user area 28 of the storage device 18, or the like. In the composite imaging mode, one first image P1 is selected from among the saved captured images is selected by the user and is displayed on the touch panel display 12.

Here, in a case where an extraction area is designated, the extraction unit 32A extracts the composition target O1 from a designated area DA designated as the extraction area. Then, a second image P2, to which the extracted composition target O1 is composed, is displayed. The subsequent processing is the same as in the above-described example.

In the example, the first image P1 is read from the memory card 29 or the user area 28 under the control of the main control unit 26. The first image P1 is recorded in the image memory 17A. The first image P1 read from the memory card 29 or the user area 28 is compressed. The image processing unit 32 reads the first image P1 from the image memory 17A and subjects the first image P1 to expansion processing. The extraction unit 32A extracts the composition target O1 from the first image P1 subjected to the expansion processing. Even in the example, the image processing unit 32 functions as an image acquisition unit that acquires the first image P1 as an image to be displayed on the touch panel display 12 as an example of a display unit.

In this way, in a case where a previous captured image can be used as the first image P1, for example, the user U is reminded of a mark or a character string reflected in a previous captured image based on a subject viewed by the user U at a travel destination, and a way of enjoying in which a composite photograph of the subject and the mark or the character string reminded from the subject becomes possible. Furthermore, composite imaging may be performed and a composite image recorded in the memory card 29 or the user area 28 may be used as the first image P1. With this, since a plurality of times of composition become possible, a way of enjoying is further broadened.

As the first image P1, not only a captured image saved in the memory card 29 or the user area 28, but also an image downloaded from a server through the Internet or the like can be used as the first image P1. Even in a case where an image is downloaded from the server, since the image is recorded in the memory card 29 or the user area 28 once, the subsequent processing is the same as in a case where a captured image from the memory card 29 or the user area 28 is used as the first image P1.

Modification Example 2

Figure 22:
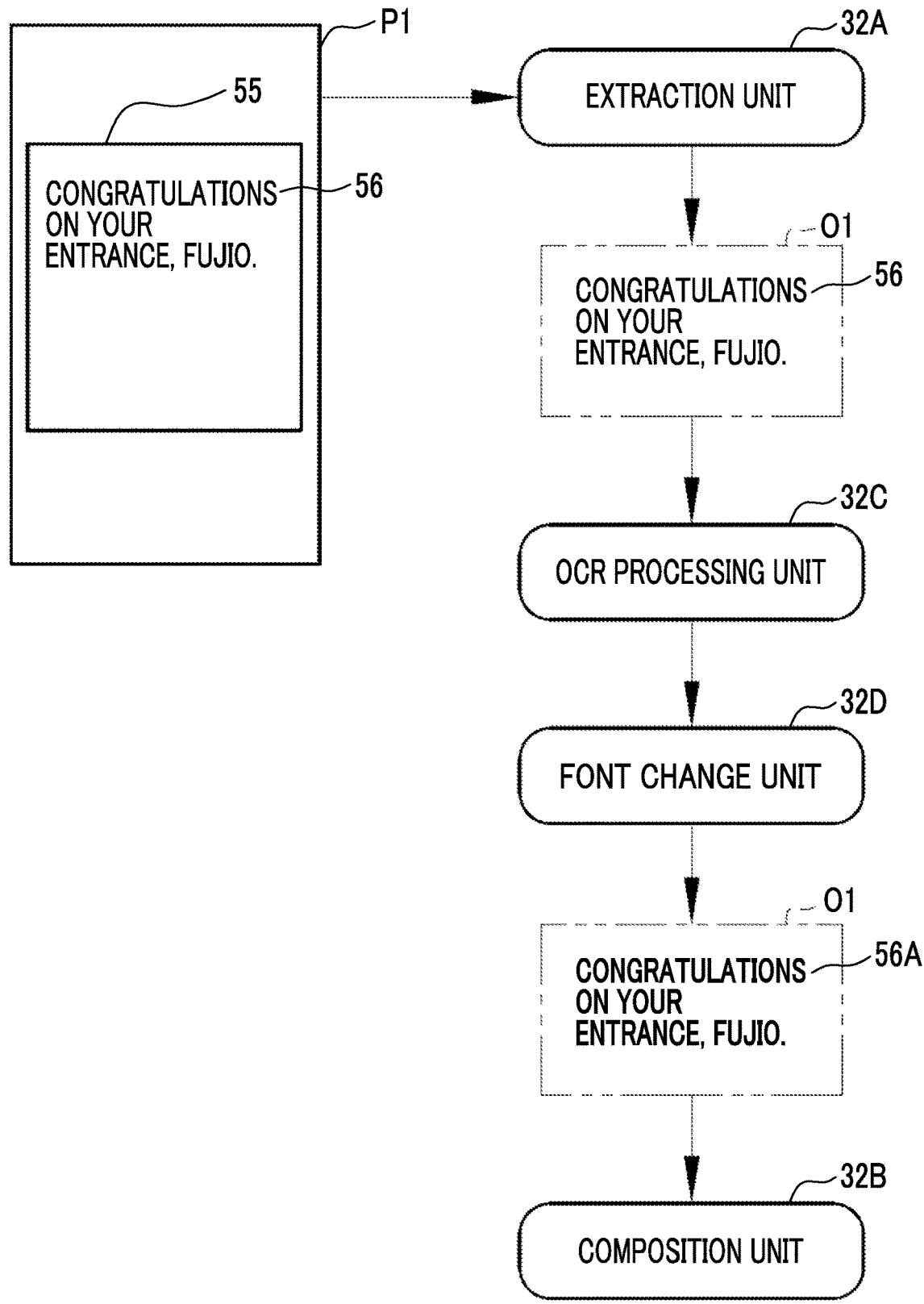
FIG. 22 is a diagram showing a modification example where OCR processing and font change processing are performed.

As shown in FIG. 22, optical character recognition (OCR) processing for converting the message 56 extracted as the composition target O1 to a set of character codes may be performed to make the font of the characters changeable, instead of extracting the message 56 as image data that is a set of pixels according to the contour of the characters.

In the example shown in FIG. 22, the image processing unit 32 functions as an OCR processing unit 32C and a font change unit 32D, in addition to the extraction unit 32A and the composition unit 32B. For example, similarly to the example shown in FIG. 20, the extraction unit 32A extracts the handwritten message 56 of "CONGRATULATION ON YOUR ENTRANCE, FUJIO." from the first image P1 as the composition target O1. The extraction unit 32A determines the contour of the characters based on contrast and extracts the message 56 as image data according to the contour.

The OCR processing unit 32C converts each character included in the message 56 one by one to a character code based on the message 56 extracted as image data. Such OCR processing is executed using a known technique, such as pattern recognition. The font change unit 32D receives the character codes from the OCR processing unit 32C and changes the font of the characters of the message 56 based on the character codes. Designation of the font is performed, for example, using a method of displaying font candidates on the touch panel display 12 as a GUI and allowing the user to select a font. The composition unit 32B composes the message 56A having the characters after the font change to the second image P2.

Modification Example 3

Figure 23:
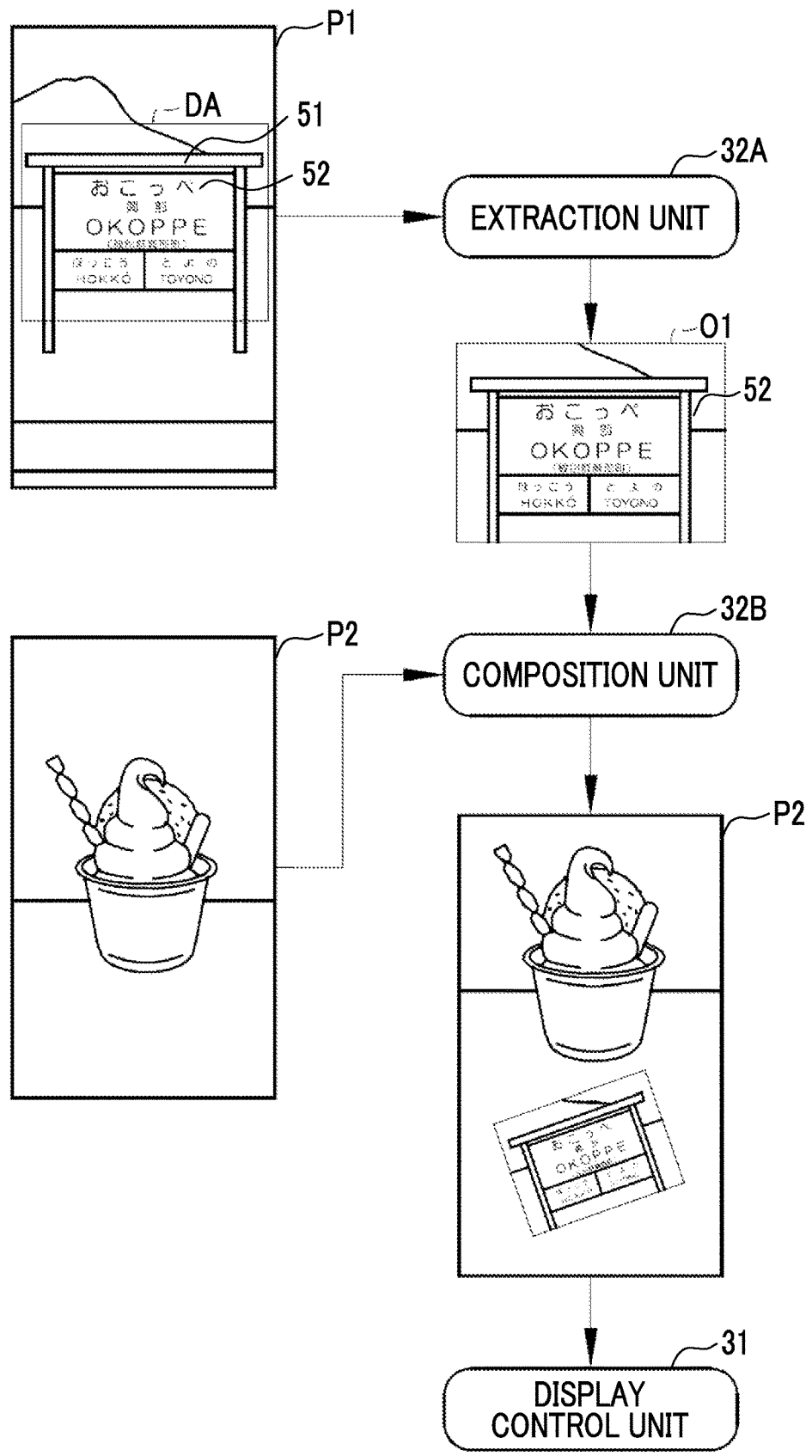
FIG. 23 is a diagram showing a modification example where a rectangular area is extracted as a composition target.

In the above-described example, although an example where a mark, such as a logo, or a character string, such as a message, is extracted as the composition target O1 is extracted along the contour of the mark or the message has been described, as shown in FIG. 23, a rectangular designated area DA may be extracted as the composition target O1 in a state of the rectangular shape, instead of extracting the mark or the character string along the contour.

In the example shown in FIG. 23, the rectangular designated area DA is designated in the first image P1. The extraction unit 32A extracts the designated area DA as the composition target O1 in a shape of the rectangular shape without determining the contour. The composition unit 32B composes the extracted rectangular composition target O1 to the second image P2. In this case, not only the mark or the character string but also the background is reflected in the extracted composition target O1. In comparison with a case where the contour is determined, deterioration may occur in appearance; however, in the example, there is an advantage that extraction processing is simplified. As the shape of the composition target O1 to be extracted, a perfect circular shape, an elliptical shape, a rhomboidal shape, or the like other than the rectangular shape may be applied.

In the example shown in FIG. 23, an eraser function capable of erasing an unnecessary portion included in the extracted composition target O1 through image processing may be provided. The eraser function is, for example, a function of displaying an icon designed after an eraser on the touch panel display 12 as a GUI and allowing the user to move and operate the icon to the unnecessary portion of the composition target O1 to erase an image at the moved position. The erased portion becomes transparent, and the second image P2 to be the background of the composition target O1 is displayed in a transparent portion. With this, there is an advantage that it is possible to erase the unnecessary portion of the composition target O1 without executing comparatively advanced image processing of contour extraction.

Modification Example 4

Figure 24:
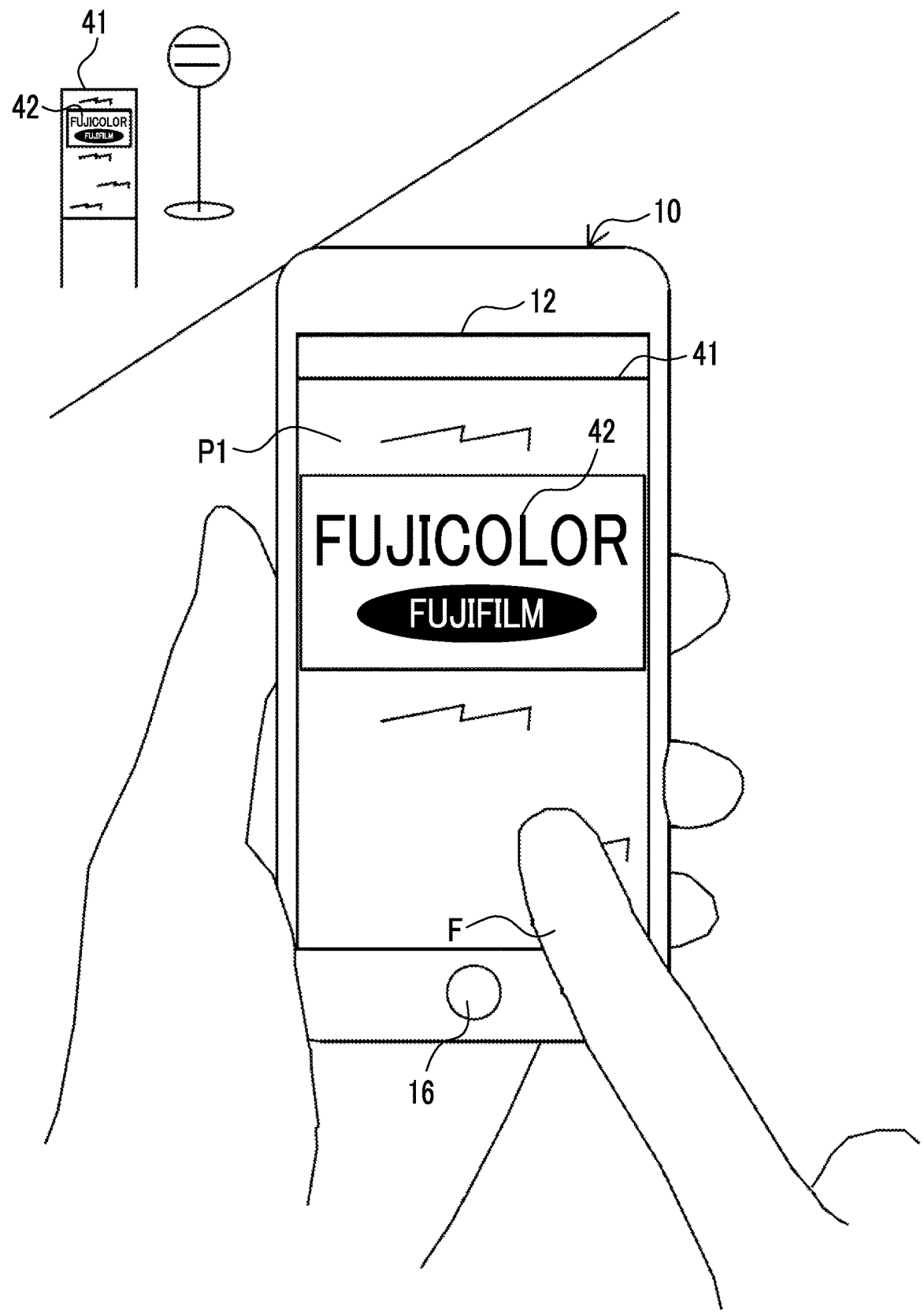
FIG. 24 is a diagram showing an example where a composition target is detected without using a target mark.
Figure 25:
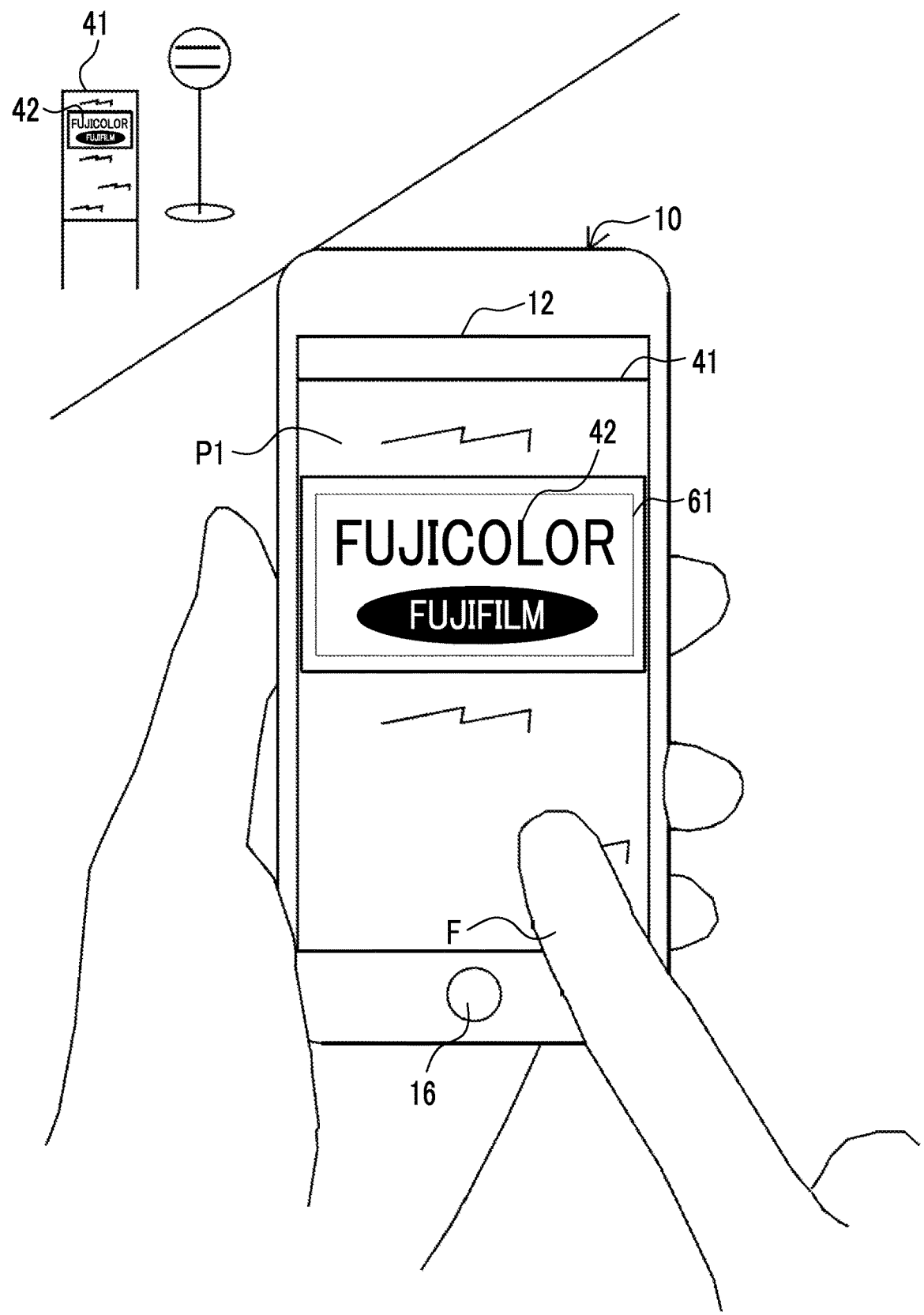
FIG. 25 is a diagram showing an aspect in which the composition target detected in FIG. 24 is identified and displayed.

An example shown in FIGS. 24 and 25 is a modification example relating to a designation method of the composition target O1 in the first image P1. In the above-described embodiment, as shown in FIG. 7, the user taps the vicinity of the target mark 46 using the target mark 46 in a state in which the target mark 46 and the composition target O1 are superimposed, thereby designating the extraction area of the composition target O1.

In contrast, in the example shown in FIGS. 24 and 25, the composition target O1 included in the first image P1 displayed on the touch panel display 12 is automatically recognized without using the target mark 46. As shown in FIG. 24, for example, in a case where any point of the display screen of the touch panel display 12 is tapped with the finger F, the extraction unit 32A performs image analysis on the first image P1 during display and detects the logo 42 that is an example of a mark or a character string to be a candidate of the composition target O1.

Then, in a case where the logo 42 is detected in the first image P1, as shown in FIG. 25, the portion of the detected logo 42 is identified and displayed by, for example, a grid-line 61. In a case where the detected logo 42 coincides with the composition target O1 desired by the user, and in a case where any point of the touch panel display 12 is tapped again, the detected logo 42 is established as the composition target O1. With this, since an operation to superimpose the target mark 46 and the composition target O1 is not needed, an operation is simple.

In a case where a plurality of marks or character strings are detected from the first image P1, a plurality of detected candidates may be identified and displayed by the grid-lines 61, and in a case where the user taps a desired candidate from among a plurality of candidates, the candidate may be established as the composition target O1.

The designation method of the composition target O1 in the first image P1 may be a method of making the user designate the composition target O1 on the display screen of the touch panel display 12 through a gesture, other than the method using the target mark 46 of the above-described embodiment and the method of Modification Example 4 described above. In regard to the gesture, for example, the user may designate the composition target O1 through pinch-in for pinching the composition target O1 with two fingers F, or the composition target O1 may be designated by a gesture to tap the composition target O1 with one finger F or to swipe with the composition target O1 as a starting point.

In addition, the above-described embodiment can be modified in various ways without departing from the spirit and scope of the invention. For example, in the above-described example, an example where the composition target O1 is extracted from the first image P1, and when the display is switched to the live view display of the second image P2, the shutter button 48 is instantly displayed has been described. Instead of instantly displaying the shutter button 48, an operation to display the shutter button 48 may be added in a one-action manner. For example, an operation button for calling the shutter button 48 at a lower left corner on a side opposite to the color change button 47 may be displayed, and the shutter button 48 may be displayed in a case where the operation button is tapped. In this case, there is an advantage that it is possible to reduce a risk of the shutter button 48 being operated carelessly instead of an operation being added with a little time and effort, compared to the above-described embodiment.

In the above-described embodiment, although a case where the composition target O1 includes the mark or the character string reflected in a partial area in the first image P1 has been described, a portion (for example, a face of a human, an impressive building, or the like) where the mark or the character string in the first image P1 is not reflected may be set as the composition target O1. Even in this case, compared to the multiple exposure imaging technique in the related art, an effect of increasing the degree of freedom relating to the decision of a subject to be reflected in the composite image is obtained. In a case where the composition target O1 is extracted based on contrast, the composition target is not limited to the mark or the character string, and any target can be extracted as long as the target has contrast to the background. Of course, in a case where the mark or the character string is included in the composition target O1, it is preferable since various ways of enjoying become possible as described above.

In the above-described embodiment, although an example where the composition target O1 is inserted into one point in the second image P2 has been described, the composition target O1 may be copied and the composition target O1 may be inserted into a plurality of points in the second image P2. In this case, for example, a copy function of the composition target O1 is provided in a menu of an edition instruction to the composition target O1. Then, in a case where a copy instruction is given during the live view display of the second image P2, the composition target O1 is copied in the second image P2 and is inserted into a plurality of points in the second image P2. In this case, it is preferable that the display position, the display posture, and the color change of the composition target O1 can be edited for each composition target O1.

In the above-described embodiment, although the portable terminal 10, such as a smartphone, has been described as an example of an imaging apparatus, an apparatus other than a smartphone may be applied, a tablet terminal may be applied as long as the tablet terminal is portable, or a normal digital camera that is a dedicated camera may be applied.

An operation program for an imaging apparatus that is shown by the photograph composition application program as an example may be installed on the storage device 18 in advance in selling the portable terminal 10 or may be installed by the user purchasing the portable terminal 10, then, accessing a server using the portable terminal 10, and downloading the operation program from the server.

The processing of the composite imaging mode that is executed by the portable terminal 10 of the present disclosure is just an example. Accordingly, it is needless to say that deletion of unnecessary steps, addition of new steps, and change of a processing order may be performed without departing from the spirit and scope of the present disclosure.

In the above-described embodiment, a combination of a plurality of steps of the composite imaging mode shown as an example in FIG. 4 corresponds to an operation method for an imaging apparatus of the present disclosure.

In the above-described embodiment, the hardware structures of the processing units (for example, an image acquisition unit, an extraction unit, a composition unit, and a display control unit) that execute various kinds of processing are various processors described below. Various processors include a programmable logic device (PLD) that is a processor capable of changing a circuit configuration after manufacture, such as a field-programmable gate array (FPGA), a dedicated electric circuit that is a processor having a circuit configuration dedicatedly designed for executing specific processing, such as an application specific integrated circuit (ASIC), and the like, in addition to a central processing unit (CPU) that is a general-purpose processor executing software (program) to function as various processing units.

Various kinds of processing described above may be executed by one of various processors or may be executed by a combination of two or more processors of the same type or different types (for example, a plurality of FPGAs, a combination of a CPU and an FPGA, or the like). A plurality of processing units may be configured of one processor. As an example where a plurality of processing units are configured of one processor, like system on chip (SOC) or the like, there is a form in which a processor for implementing all functions of a system including a plurality of processing units into one integrated circuit (IC) chip is used.

In this way, various processing units may be configured using one or more processors among various processors described above as a hardware structure.

In addition, as the hardware structure of various processors, more specifically, an electric circuit (circuitry) in which circuit elements, such as semiconductor elements, are combined can be used.

The technique of the present disclosure also includes a computer-readable storage medium (a USB memory or a digital versatile disc-read only memory (DVD-ROM)) that non-transitorily stores the operation program for an imaging apparatus, in addition to the operation program for an imaging apparatus.

What is claimed is:

1. An imaging apparatus comprising:
one or more processors configured to image a subject; and
a display that subjects an image captured by the one or more processors to live view display,
the one or more processors being further configured to:
display a first image on the display, the first image being subject to the live view display whereby a target mark is displayed in a superimposed manner for designating a designated area;
receive designation of the designated area including a composition target during the live view display of the first image;
determine an area designated as an extraction area for extracting the composition target in the first image to be the designated area;
extract the composition target from the designated area;
compose the composition target to a second image captured by the one or more processors and different from the first image, the second image being an image during live view imaging; and
perform control such that the second image, to which the composition target is composed, is subjected to live view display on the display.

2. The imaging apparatus according to claim 1,
wherein the composition target includes a mark or a character string reflected in a partial area in the first image.

3. The imaging apparatus according to claim 2,
wherein the character string includes a message, and
the mark includes at least one of a character, a figure, a pattern, or a combination of two or more selected from the character, the figure, and the pattern.

4. The imaging apparatus according to claim 2,
wherein the one or more processors are further configured to determine a contour of the mark or the character string in the first image and extract the mark or the character string along the determined contour.

5. The imaging apparatus according to claim 1,
wherein the one or more processors are further configured to extract the composition target from the first image during the live view display.

6. The imaging apparatus according to claim 5,
wherein, after the composition target is extracted from the first image during the live view display, the one or more processors are further configured to start the live view display of the second image to which the composition target is composed.

7. The imaging apparatus according to claim 1,
wherein, in a case where the composition target is extracted from the first image, the one or more processors are configured to perform a visual performance for identifying the extracted composition target and a background of the first image as an extraction source on the display.

8. The imaging apparatus according to claim 7, wherein:
the visual performance performs visual vibration for magnifying and reducing the extracted composition target little by little for a time set in advance, continues a state in which the extracted composition target is displayed on a magnified scale for a time set in advance, flickers the extracted composition target, or changes a color of the extracted composition target.

9. The imaging apparatus according to claim 1,
wherein, in a case where an image saving instruction is input during the live view display of the second image, the one or more processors are configured to record the second image, to which the composition target is composed, as a composite image for saving in a memory.

10. The imaging apparatus according to claim 1,
wherein the one or more processors are further configured to receive designation of at least one of a display position, a display posture, a display size, or a display color of the composition target as an edition instruction of the composition target in the second image during the live view display of the second image.

11. The imaging apparatus according to claim 1, wherein, in a case where the composition target includes a character, the one or more processors are further configured to convert the character to a character code; and wherein the one or more processors are further configured to:
change a font of the character based on the character code, and
compose the character after the font change to the second image.

12. The imaging apparatus according to claim 1, wherein:
the display comprises a touch panel display; and
the one or more processors are further configured to receive a designation operation of a user performed using the target mark to designate a part of the first image as the extraction area through the touch panel display.

13. The imaging apparatus according to claim 12, wherein:
the one or more processors are further configured to determine the designated area in the first image based on information regarding the designation operation prior to extracting the composition target from the determined designated area.

14. The imaging apparatus according to claim 12, wherein:
the designation of the extraction area is received in a state in which the target mark is displayed such that the composition target fits within the target mark.

15. The imaging apparatus according to claim 12, wherein:
receiving the designation operation of the user performed using the target mark to designate the part of the first image as the extraction area includes receiving a tap operation on a periphery of the target mark.

16. The imaging apparatus according to claim 1, wherein:
the one or more processors are further configured to extract the composition target from the designated area using a contour extraction technique.

17. A non-transitory computer-readable storage medium storing an operation program for an imaging apparatus comprising one or more processors configured to image a subject, and a display that subjects an image captured by the one or more processors to live view display, the operation program causing a computer to execute:
an image acquisition step of acquiring a first image on the display, the first image being subject to the live view display whereby a target mark is displayed in a superimposed manner for designating a designated area;
a receiving step of receiving designation of the designated area including a composition target during the live view display of the first image;
a determining step of determining an area designated as an extraction area for extracting the composition target in the first image to be the designated area;
an extraction step of extracting the composition target from the designated area;
a composition step of composing the composition target to a second image captured by the one or more processors and different from the first image, the second image being an image during live view imaging; and
a display control step of performing control such that the second image, to which the composition target is composed, is subjected to live view display on the display.

18. An operation method for an imaging apparatus comprising one or more processors configured to image a subject, and a display that subjects an image captured by the one or more processors to live view display, the operation method comprising:
an image acquisition step of acquiring a first image on the display, the first image being subject to the live view display whereby a target mark is displayed in a superimposed manner for designating a designated area;
a receiving step of receiving designation of the designated area including a composition target during the live view display of the first image;
a determining step of determining an area designated as an extraction area for extracting the composition target in the first image to be the designated area;
an extraction step of extracting the composition target from the designated area;
a composition step of composing the composition target to a second image captured by the one or more processors and different from the first image, the second image being an image during live view imaging; and
a display control step of performing control such that the second image, to which the composition target is composed, is subjected to live view display on the display.

* * * * *